United States Patent [19]

Peters et al.

[11] Patent Number: 5,078,786
[45] Date of Patent: Jan. 7, 1992

[54] PROCESS FOR RECOVERING METAL VALUES FROM JAROSITE SOLIDS

[75] Inventors: Mark A. Peters, Northglenn; Wayne W. Hazen, Wheat Ridge; James E. Reynolds, Lakewood, all of Colo.

[73] Assignee: Resource Technology Associates, Tulsa, Okla.

[21] Appl. No.: 438,502

[22] PCT Filed: Nov. 26, 1986

[86] PCT No.: PCT/US86/02476

§ 371 Date: May 26, 1989

§ 102(e) Date: May 26, 1989

[87] PCT Pub. No.: WO88/03911

PCT Pub. Date: Jun. 2, 1988

[51] Int. Cl.[5] .............................................. C22B 3/00
[52] U.S. Cl. ........................................ 75/432; 75/726; 75/733; 75/736; 75/961
[58] Field of Search ................. 75/432, 726, 733, 736, 75/961

[56] References Cited

U.S. PATENT DOCUMENTS

| | | |
|---|---|---|
| 820,000 | 5/1906 | Just . |
| 915,705 | 3/1909 | Seigle ...................................... 423/22 |
| 3,143,486 | 8/1964 | Pickering et al. ..................... 204/119 |
| 3,493,365 | 2/1970 | Pickering et al. . |
| 3,684,490 | 8/1972 | Steintveit ............................. 75/101 |
| 3,691,038 | 9/1978 | von Roepenack et al. ......... 204/119 |
| 3,910,784 | 10/1975 | Rastas ....................................... 75/1 |
| 3,959,437 | 5/1976 | Rastas et al. ........................... 423/36 |
| 3,969,107 | 7/1976 | Lippert et al. ......................... 75/101 |
| 4,054,637 | 10/1977 | Dreulle et al. ......................... 423/39 |
| 4,070,437 | 1/1978 | Van Ceulen .............................. 423/1 |
| 4,128,617 | 12/1978 | DeGuire et al. ..................... 423/106 |
| 4,182,852 | 3/1980 | Pammenter et al. .................. 423/42 |
| 4,244,735 | 1/1981 | Reynolds et al. ...................... 75/101 |
| 4,266,972 | 5/1981 | Redondo-Abad et al. ........... 75/101 |
| 4,305,914 | 12/1981 | Pammenter et al. ................ 423/146 |
| 4,342,592 | 8/1982 | Lamb ..................................... 75/114 |
| 4,355,005 | 10/1982 | Rastas et al. ........................... 423/41 |
| 4,366,127 | 12/1982 | Rastas et al. ........................... 423/26 |
| 4,383,979 | 5/1983 | Rastas et al. ........................... 423/36 |
| 4,410,496 | 10/1983 | Smyres et al. ........................... 423/1 |
| 4,415,540 | 11/1983 | Wilkomirsky et al. ............... 423/99 |
| 4,505,744 | 3/1985 | Weir et al. ............................. 75/120 |

OTHER PUBLICATIONS

"The Encyclopedia of Chemical Technology", Kirk-Othmer, vol. 24, pp. 812-824, 3rd Edition.
"The Jarosite Process-Past, Present & Future", V. Arregui et al. Lead-Zinc-Tin, TMS-AIME World Symposium on Metallurgy and Environmental Control, 1980, J. M. Cigon, T. S. Mackey and T. J. O'Keefe, Eds. pp. 97-123.

Primary Examiner—Peter D. Rosenberg
Attorney, Agent, or Firm—Sheridan, Ross & McIntosh

[57] ABSTRACT

This invention concerns a process for recovering metal values from jarosite-containing materials by leaching with a calcium chloride solution at a temperature above about the atmospheric boiling point of the solution and under at least the autogenous pressure.

20 Claims, 5 Drawing Sheets

PROCESS FOR RECOVERING METAL VALUES FROM JAROSITE SOLIDS

FIELD OF THE INVENTION

This invention relates to a process for recovering metal values from the jarosite containing wastes from electrolytic zinc recovery plants.

BACKGROUND OF THE INVENTION

Electrolytic zinc processes are used to treat complex zinc-containing ores that cannot readily be treated by pyrometallurgical recovery. The usual steps in such an electrolytic process include: (a) concentrating the zinc ores; (b) roasting the zinc concentrate to eliminate sulfur and produce zinc calcine; (c) leaching the zinc calcine to provide an impure zinc sulfate solution; (d) separating the iron present usually by forming a jarosite precipitate; (e) purifying the zinc sulfate solution; and (f) subjecting the zinc sulfate solution to electrolysis to recover the zinc metal. Such a process is described in U.S. Pat. No. 4,128,617 (1978) of DeGuire et al. which is incorporated herein by reference. A simplified process flow sheet for an electrolytic zinc plant is shown in FIG. 1.

Additional details of various process modifications can be found in "The Encyclopedia of Chemical Technology", Kirk-Othmer, Vol. 24, pp. 812-824, 3rd Ed, incorporated herein by reference.

As indicated above, a common method of removing the iron present in the leachate is through the formation of a "jarosite" precipitate. Jarosite, $MFe_3(SO_4)_2(OH)_6$ where M is a monovalent ion, usually an alkali metal (general sodium or potassium) or ammonium, is commonly formed by adding a source of ammonium or sodium ions to the leach solution and maintaining the solution at an appropriate pH by the addition of base. This process is also shown in FIG. 1. Various modifications to the so-called "jarosite process" are discussed in the article entitled "The Jarosite Process—Past, Present and Future", V. Arregui et al., Lead-Zinc-Tin, TMS-AIME World Symposium on Metallurgy and Environmental Control, 1980, J. M. Cigon, T. S. Mackey and T. J. O'Keefe, Ed., pp. 97-123, incorporated herein by reference.

There are a number of problems associated with the formation of jarosite waste material. The jarosite can contain valuable metals such as silver, zinc, copper, lead, indium, etc. which require numerous expensive process steps to recover. The jarosite can also contain toxic species which can be leached into the environment by rain and groundwater. Therefore to avoid environmental contamination it is usually necessary to store the jarosite wastes in sealed lagoons which are expensive to build.

A number of methods for treating such wastes have been disclosed. Steintveit et al. in Norwegian Patent 142,406 (1980) disclose a process for leaching iron-containing waste with chloride-containing, acidic solution at a temperature between 50° C. and the boiling point of the solution. An alkali metal chloride or an alkaline earth metal chloride is used as the source of the chloride with calcium chloride being disclosed as the preferred material. The pH of the solution is adjusted during the leaching step so that the iron remains as a precipitate while the valuable metals are leached into the hot solution. The pH is adjusted to between about 2 and 4 preferably with calcium hydroxide. It is disclosed that these conditions allow extraction of up to 95 percent of the lead and silver content of the waste. However, Applicants have found that unpredictably with some jarosite wastes this process provides recoveries of less than 20 percent of the silver present.

U.S. Pat. No. 4,054,638 of Dreulle et al. (1977) is directed to a process for recovering metals from sulfated residues from electrolytic zinc plants. The residue is digested preferably at a temperature between 95° and 115° C. with hydrochloric acid in the presence of calcium chloride. This leaching process dissolves the metals present, including the iron, by forming the corresponding metal chlorides. Consequently, the process requires that the iron chloride be removed by extraction by an organic solvent. This process has a disadvantage of solubilizing the iron and requiring a separate separation step. There is no suggestion or disclosure of using superatmospheric pressure for this leach.

U.S. Pat. No. 4,070,437 of Van Ceulen (1978), discloses a process for recovery of metals from jarosite sludges. The process involves leaching the jarosite with an acidic calcium chloride solution, preferably formed by mixing hydrochloric acid and calcium hydroxide or calcium carbonate. The leaching is preferably carried out close to the boiling point of the leaching medium. Insoluble calcium sulfate is formed and is separated by filtration. This process has the disadvantage of solubilizing essentially all of the iron in the jarosite.

Another waste which contains metal values is zinc ferrite-containing materials. Modern electrolytic zinc processes commonly use a two-step leaching process as depicted in FIG. 1. The second leaching step involves a hot acid leach to dissolve zinc ferrite present. However, prior to the development of the two-step leach, a single neutral leach was used which caused much of the zinc ferrite and associated metal values to be discarded as wastes. Therefore, there are existing waste lagoons which contain substantial quantities of zinc ferrite and other metal values. The term "ferrite" is used herein to refer to a combined metal oxide-ferric oxide material, e.g. zinc ferrite ($ZnO.Fe_2O_3$).

A number of processes have been developed for the purpose of recovering this zinc. One such process is disclosed by Rastas et al. in U.S. Pat. No. 3,959,437 (1976). Rastas et al. disclose a process in which the ferrite of a non-ferrous metal, as well as the oxide of the non-ferrous metal, is subjected to a neutral leach which dissolves most of the oxide but leaves the ferrite substantially unaffected. The non-ferrous values in the solution are recovered and the undissolved ferrite material is further treated in a "conversion" stage with sulfuric acid-bearing solution at atmospheric pressure and at a temperature of about 80° C. to about 105° C. in the presence of alkali or ammonium ions. Under these conditions, the non-ferrous metals dissolve as sulfates, while iron is simultaneously precipitated as an insoluble complex sulfate, i.e., jarosite. U.S. Pat. No. 4,355,005 of Rastas et al. (1982), U.S. Pat. No. 4,366,127 of Rastas et al. (1982), as well as U.S. Pat. No. 4,383,979 of Rastas et al. (1983) each disclose modifications to the process disclosed in the '437 patent.

Steintveit in U.S. Pat. No. 3,684,490 (1972) discloses a method for treating jarosite residue in which the residue is subjected to leaching with sulfuric acid at a temperature of 50° to 95° C. and an acid concentration of 10 to 70 grams per liter (hereinafter g/l). These leaching conditions are intended to decompose any zinc ferrites present and provide for a greater recovery of the zinc.

U.S. Pat. No. 3,691,038 of Von Roepenack et al. (1972) discloses a method for recovering zinc from oxides containing zinc and iron. The oxide is leached with sulfuric acid at a temperature of 95° to 100° C. with an excess of sulfuric acid to solubilize the zinc and iron. Alkali metal or ammonium ions are added to the liquid phase along with a zinc-containing oxidic material at a temperature of 95° to 100° C. to precipitate jarosite.

U.S. Pat. No. 4,192,852 of Pammenter et al. (1980) discloses a process for treating zinc plant residues containing zinc ferrite and precipitating the iron as a jarosite. The sulfate solution containing ferric iron, free acid and non-ferrous metals is cooled, partially neutralized and then heated to a temperature not exceeding the boiling point at atmospheric pressure in the presence of sodium, potassium or ammonium ions. U.S. Pat. No. 4,305,914 of Pammenter et al. (1981) discloses a process similar to that in the '852 patent.

U.S. Pat. No. 4,128,617, of DeGuire et al. (1978), describes a three-step process for the treatment of zinc calcine containing zinc oxide, zinc sulfates, and zinc ferrites. The first step involves the neutral leaching of the zinc calcine with an effective amount of aqueous sulfuric acid containing solution. The leach residue is subjected to hot acid leaching with sulfuric acid followed by jarosite precipitation by alkali with the subsequent recycling of the jarosite-containing pulp. The preferred temperature range for the hot acid leaching is from about 80° C. to the boiling point and preferably the temperature is greater than 90° C. There is no suggestion of the use of pressure.

The processes described hereinabove have one or more of the disadvantages of (1) having low rates of extraction of metal values, (2) providing low levels of recovery of certain metal values, (3) having poor filterability of the iron-containing residue, and/or (4) solubilizing large amounts of iron.

Several processes disclosed in the art have used elevated temperature and pressure leaching steps in treating zinc plant residues.

U.S. Pat. No. 3,143,486 of Pickering et al. (1964) discloses a process for the extraction of zinc from zinc ferrite containing residue. The process involves subjecting the residue to a first-stage leaching treatment under non-oxidizing conditions in a closed vessel in the presence of excess sulfuric acid at a temperature between 140° C. and 260° C. Zinc is dissolved as well as ferrous sulfate which is stable at the temperatures and acidities used. Ferric iron is precipitated as a basic sulfate. The leachate is then subjected to a second-stage leaching treatment at 140° C. to 260° C. under oxidizing conditions to oxidize the ferrous sulfate to ferric and precipitate the ferric material. Similarly, U.S. Pat. No. 3,493,365 of Pickering et al. (1970) discloses a two-step high temperature method of treating zinc plant residue containing zinc ferrite. This process differs from that of the '486 patent in that in the second step a source of a cation selected from the group consisting of sodium, potassium and ammonium is added in order to precipitate the iron from the liquor as a jarosite material.

A process for treating sulfide ores which involves a two-step leach is disclosed by U.S. Pat. No. 4,266,972 of Redodno-Abad et al., (1981). The first leach uses sulfuric acid under an oxygen atmosphere at 150° to 250° C. Zinc and copper are solubilized with lead, the noble metals, and iron oxide remaining as a residue. After a solid liquid separation, the filtrate is adjusted to a pH of 1.5 to 2. Sodium chloride, calcium chloride and ferric chloride are added to precipitate calcium sulfate. The leach is conducted at a temperature between 60° C. and 90° C. with the silver, lead, and gold being solubilized as the chlorides. The iron oxide remains as a residue. After a solid/liquid separation, the silver, lead, and gold are recovered by cementation with zinc, with the liquid being subjected to an extraction to recover the zinc.

None of these processes which use high temperature and pressurized leaches discloses or suggests that jarosite-containing wastes can be advantageously treated in such a manner. In fact, most disclose the use of an oxidizing atmosphere to form ferric iron which will precipitate. These patents also disclose that potassium ions can be added to a zinc ferrite leach solution in order to precipitate potassium jarosite. As discussed in detail hereinbelow, it has been found that the recovery of metal values can be unpredictably affected by the presence of potassium ions.

Accordingly, there is a need for a process to treat jarosite and ferrite containing wastes from zinc recovery processes in order to recover metal values which are contained in the waste materials and render the residue suitable for disposal as a nonhazardous waste. There is also the need for a process which will not be subject to the unpredictable effect of potassium ions.

SUMMARY OF THE INVENTION

It has now been found that the above described disadvantages of known processes can be minimized or eliminated by the instant invention. According to the present invention, a process is provided for recovering metal values from jarosite wastes from a zinc recovery plant said process comprising leaching the waste with an acidic solution of calcium chloride at or above the atmospheric boiling point of the solution and under at least the atmospheric pressure.

One of the embodiments of the instant invention comprises a process for recovering metal values from jarosite-containing wastes from a zinc plant using an acidic solution of calcium chloride at a temperature above the boiling point of the solution and under super-atmospheric pressure.

Another embodiment of the instant invention comprises a process for recovering metal values from a jarosite-containing waste wherein the process comprises contacting the waste at a temperature of between about 110° C. and 300° C. and a pressure of at least the auto genous pressure with a solution containing between 1.0 and 5.0 molar calcium chloride. The contacting solution has a pH of between about 2.0 and 3.5. This pH is maintained by the addition of a calcium compound selected from the group consisting of calcium oxide, calcium hydroxide, calcium carbonate and mixtures thereof.

In a further embodiment, the instant invention comprises a process in which jarosite-containing wastes are leached with an acidic solution of calcium chloride at greater than atmospheric pressure and a temperature greater than the atmospheric boiling point of the solution to form a liquid leachate and a solid residue. The liquid leachate is separated from the solid residue and contacted with a reducing metal to reduce silver cations contained in the leachate to metallic silver. The metallic silver is then separated from the liquid solution. The liquid solution is sulfided by mixing the solution with a sulfide compound to precipitate the lead contained in the solution as lead sulfide. The solid lead sulfide is separated from the liquid phase. Substantially all of the zinc in the remaining liquid phase is recovered using a zinc recovery process to provide a liquid solution substantially free of zinc. The resulting liquid solution is heated with calcium oxide to provide a vapor containing ammonium hydroxide and bottoms which contain calcium chloride.

In another embodiment, the instant invention comprises contacting a ferrite which contains metal values with a leach solution of sulfuric acid and ammonium ions. The leach solution containing the ferrite is heated at a temperature above about 90° C. for up to about 12 hours to form a solid containing ammonium jarosite and a liquid phase. The solid phase is mixed with an acidic leaching solution containing calcium chloride. This mixture is heated at superatmospheric pressure and at a temperature above the atmospheric boiling point of the solution to solubilize a substantial portion of the metal values.

DESCRIPTION OF THE PREFERRED EMBODIMENTS

The process of this invention comprises a method for recovering metal values from jarosite containing wastes from electrolytic metal recovery plants. The jarosite waste is leached at or above the boiling point of the leach solution under pressure with an acidic calcium chloride solution. Optionally, non-jarosite wastes such as zinc ferrite can be subjected to a preleach step in which the iron is converted to jarosite material and the zinc is substantially solubilized.

The use of a high temperature, pressurized leaching process for leaching jarosite has been found to provide several unexpected advantages over the lower temperature, atmospheric pressure processes described in the prior art. It has been found that the final leach slurry unexpectedly filters two to three times faster than comparable slurries obtained with a 95° C. to 100° C. leach such as that described by Steintveit in Norwegian Patent No. 142,406 (Supra). Additionally, the leach times are significantly less than those required when leach temperatures below 100° C. are used. This procedure has also been found to provide higher extractions of metal values from certain types of wastes than obtained with the lower temperature leaches.

Figure 1:
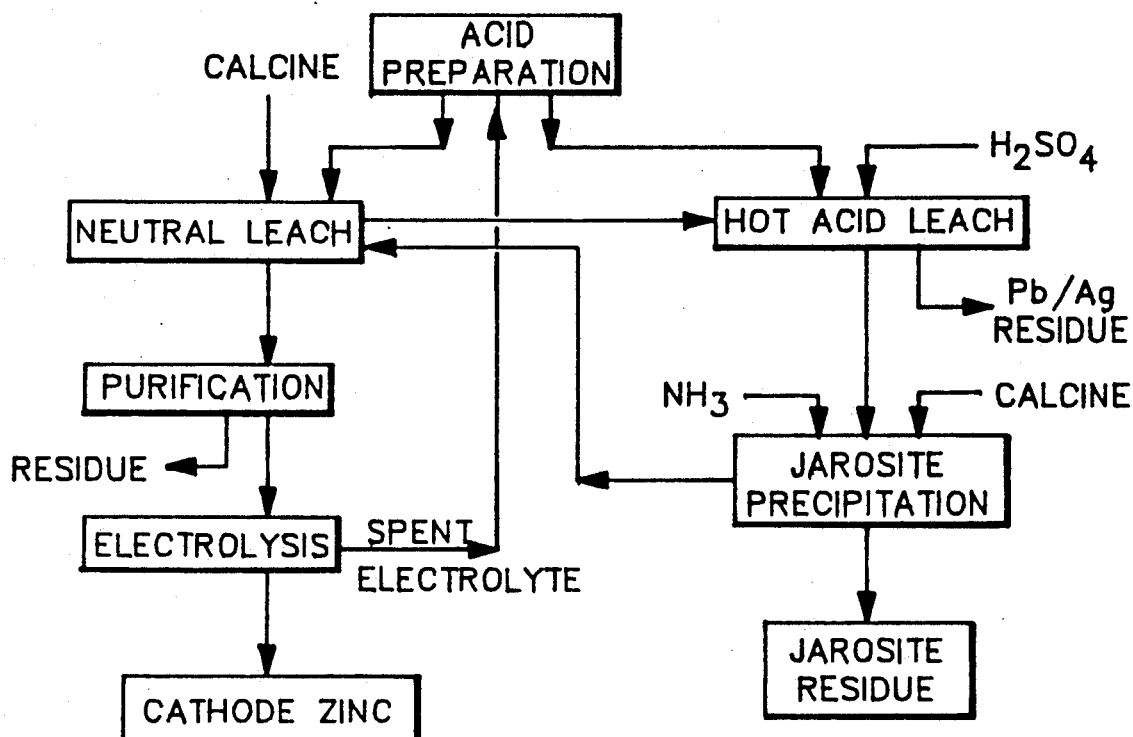
FIG. 1 shows a typical process flowsheet for an electrolytic zinc plant.
Figure 2:
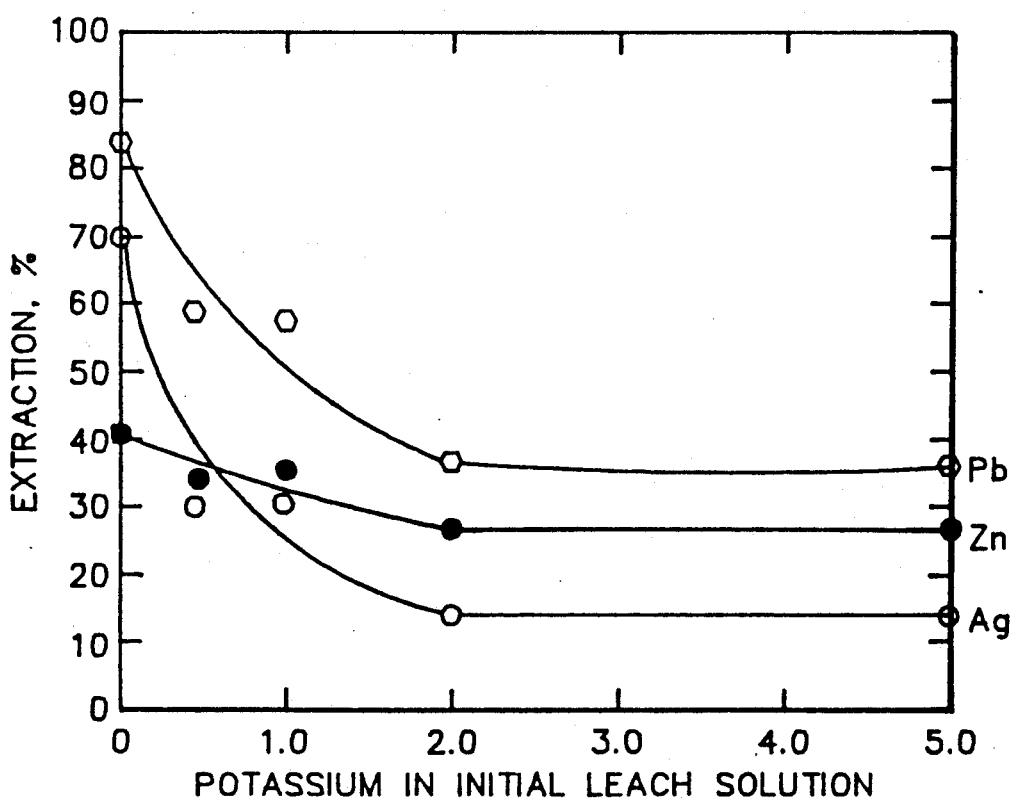
FIG. 2 shows the effect of potassium on metals extraction.
Figure 3:
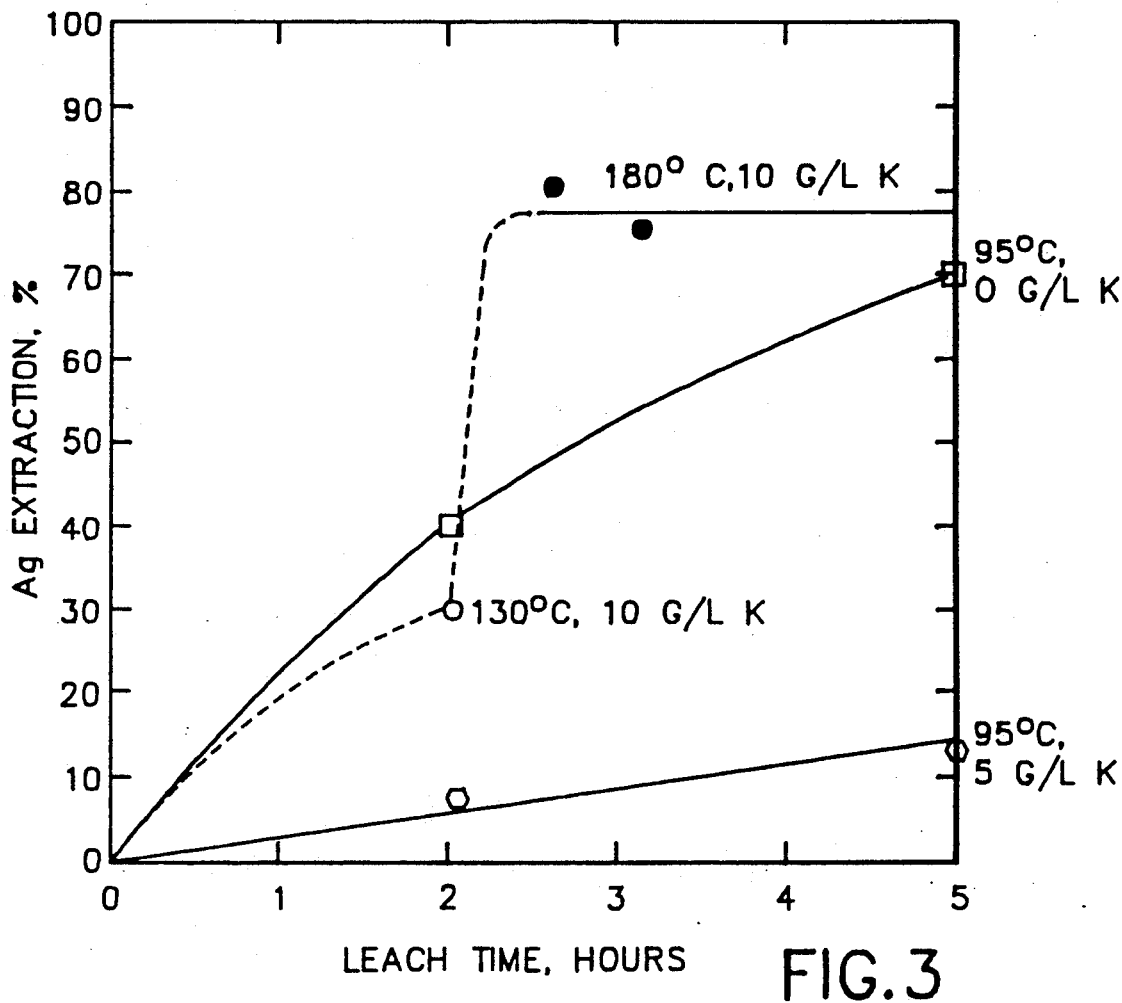
FIG. 3 shows the effect of temperature and potassium concentration on silver extraction.

It has also been found that certain materials unexpectedly interfere with the recovery of metal values from jarosite. In particular, it has been observed that with some jarosite wastes the presence of potassium ions can result in significantly lower recoveries of metal values such as silver and lead from the leach solution. FIG. 2 is a graphic presentation of experimental data showing the effect of potassium on the amount of metal extracted. This effect is particularly evident at lower leaching temperatures. Thus, using higher leaching temperatures than disclosed in the prior art appears to unexpectedly compensate for the presence of potassium in the leaching solution. Graphic evidence of this previously unrecognized phenomenon is provided in FIG. 3 where the effect of increasing the extraction temperature from 130° C. to 180° C. is shown. The results also show that only 10 percent of the silver was extracted at 95° C. when 5 grams per liter of potassium were present. With 10 grams per liter of potassium, 80 percent of the silver was extracted at 180° C.

The detrimental effect of ionic potassium is not observed with every jarosite material. Differences in the effect of potassium concentration on the recovery of silver have even been observed on samples of jarosite obtained from different locations in the same waste lagoon. Although extensive work has been done to determine the basis of this phenomenon, the reason remains unknown. A method for predicting the magnitude of this effect has not been discovered as yet. Therefore, practicing the present invention assures that the recovery of metal values can be maximized even with variations in the magnitude of the potassium effect.

The leaching process for ammonium jarosite can be represented by the following reaction scheme.

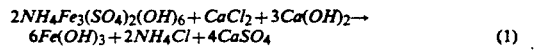

$$2NH_4Fe_3(SO_4)_2(OH)_6 + CaCl_2 + 3Ca(OH)_2 \rightarrow 6Fe(OH)_3 + 2NH_4Cl + 4CaSO_4 \qquad (1)$$

The overall leach process, including regeneration of $CaCl_2$, may be represented by combining the above reaction with the reaction occurring during the "lime boil" operation,

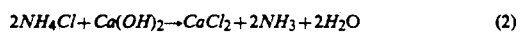

$$2NH_4Cl + Ca(OH)_2 \rightarrow CaCl_2 + 2NH_3 + 2H_2O \qquad (2)$$

to get the following overall reaction,

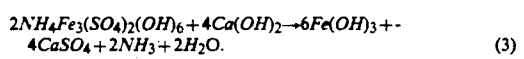

$$2NH_4Fe_3(SO_4)_2(OH)_6 + 4Ca(OH)_2 \rightarrow 6Fe(OH)_3 + 4CaSO_4 + 2NH_3 + 2H_2O. \qquad (3)$$

The calcium chloride leaching process of the instant invention is normally conducted at or in excess of the atmospheric boiling point of the leach solution. As used herein, the terms "atmospheric boiling point" and "boiling point" are used interchangeably to refer to the temperature at which the solution boils under the particular atmospheric pressure to which it is being subjected. Thus the boiling point for a solution of the same composition can vary depending upon the geographical elevation at which it is heated. Ordinarily, the boiling point of the leach solution is in excess of 110° C. It has been found that leaching at a temperature of at least the boiling point of the solution and preferably above 110° C. provides improved results in extracting metal values from the jarosite-containing waste materials. The boiling point of the leaching solution can be increased by increasing the concentration of calcium chloride in the solution. Therefore, it is contemplated that the instant invention encompasses the embodiment of heating a solution at or above 110° C. even though the boiling point of the solution is in excess of 110° C. Leaching temperatures from the boiling point to about 300° C. can be used with temperatures of between about 120° C. and 225° C. being preferred and temperatures of between about 130° C. and 200° C. being most preferred. The pressure on the leaching solution has not been found to be critical as long as the pressure is sufficient to prevent, the solution from boiling. Ordinarily, autogenous pressure is maintained in the system, i.e. greater than 1 atmosphere and preferably at least about 1.1 atmospheres. As used herein, the term "autogenous pressure" means that pressure which develops in a closed system when the system is heated.

The concentration of calcium chloride should be maintained above about 0.5 molar in the leaching solution to achieve the best extraction and solubilization of metal values. The concentration can range from about 0.5 molar up to the saturation point for calcium chloride for the particular temperature and solution. It is preferred that the concentration of calcium chloride be between about 1 molar and about 4 molar in the leaching solution with the most preferred concentration of calcium chloride between about 2 and 3.5 molar.

Calcium chloride can be added to the leaching solution directly or can be formed in situ by using a chloride source and a calcium source. For example, materials such as hydrogen chloride, sodium chloride and ammonium chloride can be used as the chloride source. Useful sources of calcium include lime, hydrated lime, and calcium carbonate. The particular materials used depends upon the economics. The use of the calcium oxide or calcium hydroxide as the calcium source has the additional advantage that the pH of the solution can be adjusted to the desired range by their addition. To avoid the buildup of certain cations, e.g. sodium, in a continuous system, it may be necessary to bleed a small stream out of the recycle or to remove the cation by other means such as ion exchange.

For effective leaching with calcium chloride, it is important that the pH of the solution be less than about 5. It is preferred that the pH be less than about 4 and most preferred that the pH be less than about 3. For best results, the extraction should be carried in a pH range of about 2.0 to 3.0 During the calcium chloride leach of the jarosite, the pH of the solution can decrease to a pH of less than 1.0 unless adjusted by the addition of a base. Although any base, such as sodium hydroxide or sodium carbonate can be used, it is advantageous as discussed hereinabove to use a calcium containing base such as calcium oxide, calcium hydroxide or calcium carbonate.

Other things being equal, the higher the leaching temperature, the shorter the leaching time required to achieve a particular level of extraction of metal values. The time required for the extraction depends upon the concentration of calcium chloride in the leach solution, the temperature at which the leaching is conducted, the pH of the solution and the particular waste feed being treated. Ordinarily, the jarosite leaching requires less than about 6 hours with leach times in the range of about 5 minutes up to about 2 hours being preferred. At the higher leaching temperatures, it is expected that in excess of about 75 percent and preferably in excess of 85 percent of the silver and lead present in the jarosite is solubilized during the preferred leaching time.

The jarosite-containing waste materials suitable for use as feed to the calcium chloride leaching process comprise materials which contain the metal values such as zinc, silver, lead, indium. The preferred feeds are jarosite residues from an electrolytic zinc process. The material called jarosite has the formula $MFe_3(SO_4)_2(OH)_6$. There are a variety of jarosite type compounds which contain different ions in place of the M, for example, potassium, lead, silver, sodium, rubidium or ammonium. Ammonium jarosite is a principal effluent from an electrolytic zinc process.

Other iron containing materials can be used as feeds to produce jarosite e.g. zinc ferrite ($ZnFe_2O_4$). The zinc ferrite used can be any such material containing metal values. The source of zinc ferrite is ordinarily waste lagoons from zinc plants.

An alternative source of zinc ferrite material is the dust formed during steelmaking in an electric arc furnace (EAF). The dust primarily comprises zinc ferrite, zinc oxide, and various forms of ferric oxide. The dust can also contain lead, cadmium and chromium and is therefore usually classified as a hazardous waste. The dust can additionally contain metal values such as silver. Thus, the dust can be fed into the process of the instant invention to allow recovery of metal values and/or removal of the toxic metals.

In order to be used in the present process, the EAF ferrite is subjected to a leach operation in which the ferrite is contacted with sulfuric acid and an ammonium source to precipitate ammonium jarosite which contains some of the metal values. The ammonium jarosite can then be conveyed to the calcium chloride leaching process.

Figure 4:
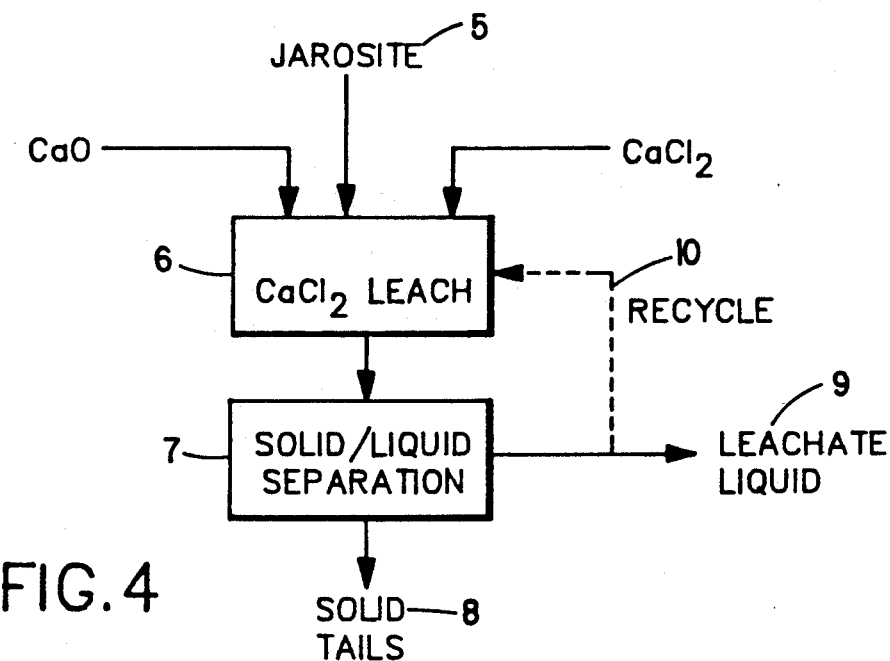
FIG. 4 shows the flowsheet for a high temperature calcium chloride leach.

In the practice of the instant leaching process, the jarosite 5 is added to the leaching vessel 6 along with calcium chloride as represented in FIG. 4. The calcium chloride can be makeup or be recycled from downstream process steps or a mixture of the two sources. During the high temperature leaching process, the pH of the solution tends to decrease due to generation of acid. The pH is adjusted to the preferred leaching range by adding a basic material, preferably calcium oxide, calcium carbonate, and/or calcium hydroxide. The solution is heated to the leaching temperature, preferably by steam, with agitation of the mixture. After the appropriate leaching time, the resulting slurry is subjected to a liquid-solid separation 7 to provide solid tails 8 and a liquid leachate 9. The solid tails contain iron oxides, gypsum, and/or unreacted gangue while the liquid leachate contains solubilized zinc and other metal values. The tails are discarded while the leachate is subjected to further downstream treatment as discussed in more detail hereinbelow. Optionally, a portion of the leachate is recycled 10 to the calcium chloride leach step to effect a build-up of metals in the pregnant solution.

Figure 5:
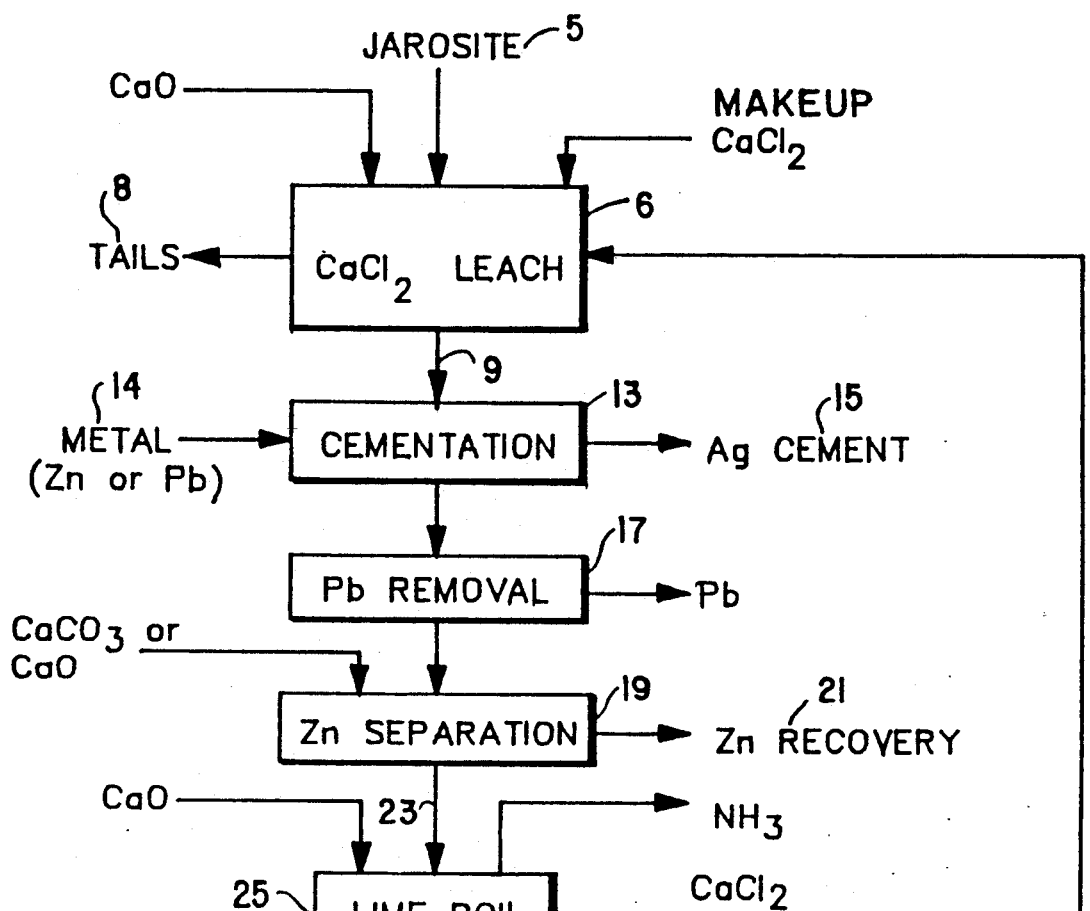
FIG. 5 shows a process flowsheet for the recovery of metal values from jarosite.

The leachate from the calcium chloride leaching process can be treated by any suitable method to remove the metal values such as copper, silver, or gold which might be present. When silver and copper are present, it is preferred that a metal cementation process be used to remove the silver and/or copper. As represented in FIG. 5, this can be accomplished by treating the leachate with any material which is a suitable reductant for the metal values. Metals which have higher reduction potentials than silver, such as lead or zinc, can be used to form a silver cement. Presently for economic reasons, it is preferred to use zinc dust. Zinc dust can be added to precipitate a solid consisting of a mixture of silver, lead, copper (depending upon the presence of the particular metal in the solution) and zinc. The solid product which is separated from the liquid phase can then be subjected to additional standard metallurgical processes to recover the pure metal values. The separation of the solid product from the liquid phase can be accomplished by standard solid-liquid separation techniques such as filtration or centrifugation.

The liquid from the metal cementation process contains dissolved reducing metal, calcium chloride, lead, zinc and other noncementable impurities. The liquid can then be subjected to additional processing steps to separate the reducing metal and other metals such as lead and zinc (if not used as the reducing metal) from the liquid. Optionally, the liquid can be subjected to a sulfide precipitation procedure to recover the lead and any trace of heavy metals which precipitate as sulfides under these conditions. The sulfide precipitation can be accomplished by adding a sulfide-containing material such as hydrogen sulfide to the liquid to form solid lead sulfide. The liquid can then be separated from the solid lead sulfide cake by conventional solid-liquid separation techniques. Alternatively, the pH of the liquid can be adjusted to precipitate metals such as lead and zinc as their hydroxides. For example, calcium oxide can be added to precipitate lead hydroxide and zinc hydroxide. In another embodiment, the liquid from the metal cementation process is subjected to an extraction process to separate zinc as described herein below. The raffinate can be partially neutralized to a pH of about 8-9 to form a lead hydroxide precipitate which is separated from the liquid. The liquid can then be subjected to a lime boil as discussed below. The particular choice of procedures to be used to treat the liquid will depend upon the metals present, their concentrations and the economics of the various alternatives. The solids recovered can be disposed of in an appropriate manner or can be subjected to additional processing steps to recover any metal values present.

The liquid from the lead removal process can be subjected to zinc recovery procedures. Any standard method of recovery suitable for removing zinc from such a solution can be used. A preferred method is solvent extraction in which the aqueous solution containing zinc is contacted with an extractant which transfers the zinc from the aqueous solution to the organic phase. The second phase can be a solvent which is not miscible with the aqueous solution or it can comprise the extractant. Alternatively, the liquor containing the zinc can be passed through an ion exchange resin to remove the zinc. A preferred method involves the use of extractants such as di-2-ethylhexyl phosphoric acid dissolved in a hydrocarbon solvent such as kerosene. In the use of such materials, the pH is adjusted to determine the phase in which the zinc ultimately resides. In a preferred method of operation, the zinc species is selectively extracted into the organic phase by maintaining the pH in an appropriate range depending on the extractant used. The pH can be adjusted with a base such as calcium oxide, calcium hydroxide, calcium carbonate, etc. Zinc is then stripped from the loaded organic with a strong acid solution such as spent electrolyte from a zinc plant. Strip liquor containing the zinc can be transferred to the zinc plant for electrowinning.

The raffinate from which the zinc has been removed can be subjected to additional processing to recover the calcium chloride and ammonia. A base can be added to increase the pH of the solution to a basic range, preferably above about 9. Although bases such as NaOH or KOH can be used, it is preferred that a basic calcium compound such as calcium oxide, calcium hydroxide, calcium carbonate or mixtures thereof be used to avoid build-up of undesired materials such as potassium ions in the system if recycle is used. Preferably a "lime boil" operation can be used in which lime is added to the raffinate to increase the pH to a basic range, preferably above about 9, and the mixture heated to form ammonia which can be removed by volatilization. Preferably, a temperature of at least the boiling point of the solution is used. The ammonia formed is removed, usually in the vapor, and can be used to form jarosite in the ferrite treating process described hereinbelow or can be transferred to the zinc plant. The brine solution from the lime boil process contains calcium chloride as well as residual metal values. This brine solution can be recycled for use in the calcium chloride leaching process.

An alternative method for recovering the zinc is to treat the liquor from the sulfiding procedure with a base such as calcium oxide to precipitate zinc hydroxide. In this operation (not shown in FIG. 5), sufficient base is added to provide a solution pH of between about 8 and 10. Bases which are useful in this process include calcium hydroxide, calcium oxide, sodium hydroxide, etc., provided there is no detrimental build-up of cations in the system. The zinc hydroxide precipitate is separated from the liquor by standard liquid-solid separation techniques such as filtration or centrifugation. The zinc hydroxide solid is preferably transferred to a zinc plant for recovery of the zinc. The liquor from this precipitation process is transferred to a lime boil process as described hereinabove.

Depending upon the level of lead and/or zinc present in the liquor from the silver cementation process, the basic precipitation step can be optionally performed on the liquor from the silver cementation step. This will result in a mixture of lead hydroxide and zinc hydroxide solids being formed. After a solid/liquid separation, these solids can be disposed of in any manner appropriate. The liquor from this precipitation step is transferred to a lime boil process as described hereinabove.

When zinc ferrite ($ZnFe_2O_4$) is a significant component of the waste, a sulfuric acid (sulfuric) leach step is used. In this leach there is a simultaneous leach of the ferrite and a precipitation of the iron in the form of jarosite. A method for this simultaneous leach and precipitation is described by Rastas et al. in U.S. Pat. No. 3,959,437 (1976). Rastas, however, is only concerned with solubilizing the zinc in the ferrite and does not treat the jarosite to recover metal values.

In the present invention, the ferrite material is combined with sulfuric acid and an ammonium source at a temperature above about 50° C. and below the decomposition temperature of ammonium jarosite. Preferably, the temperature is between about 80° C. and about 170° C. The sulfuric acid used is preferably spent electrolyte from an electrolytic zinc plant and is in the ferrite leach solution to the extent of between about 10 and about 60 grams per liter, preferably between about 30 and about 50 g/l. The ammonium compound is preferably recovered from the lime boil process step described hereinabove. This leach is ordinarily conducted at a temperature of about 80° C. to 100° C. However, as discussed hereinabove, the leach can be accomplished at a temperature above the boiling point of the solution under pressure. It is contemplated that the leach is conducted under autogenous pressure at the elevated leaching temperatures.

The ferrite leach is conducted for a period sufficient to precipitate jarosite and solubilize zinc. Preferably the leach time is about 12 to 36 hours. Commonly, at least about 70 percent of the zinc present in the ferrite is solublized with less than five percent of the iron and essentially no silver or lead solubilized. The solid jarosite containing metal values and any remaining untreated ferrite is separated from the liquid phase by standard solid-liquid separation techniques such as thickening, filtration or centrifugation. The liquor from the ferrite leach step which contains zinc sulfate is preferably conveyed to a zinc plant for recovery of the zinc. The solid jarosite is subjected to the calcium chloride leach process described hereinabove.

Referring now to FIG. 4, a process involving a calcium chloride leach of jarosite in a system at a temperature above the boiling point of the solution is represented. Preferred embodiments of this process are hereinafter described. Sufficient jarosite 5 is added to the leaching vessel 6 to provide a slurry containing about 10 to about 40 weight percent jarosite. A chloride source such as calcium chloride is added to the slurry. Alternatively, other chloride sources can be used depending upon the economics of the process. The pH is maintained in the desired range of about 1.5 to about 3.5 by the addition of lime, i.e. calcium oxide, and/or calcium hydroxide, calcium carbonate. The slurry is heated to a temperature ordinarily above the boiling point of the solution, normally above 110° C. and preferably above about 120° C. The leaching zone or leaching vessel must be capable of withstanding the equilibrium pressure at the temperature selected. While the vessel can be pressurized with an inert gas, in ordinary operation it is maintained under autogenous pressure, i.e. the pressure established in the vessel by the vaporization of volatile components such as water at the leaching temperature. Ordinarily, the pressure in the leaching zone will be between about 5 to about 210 psig with the preferred range being from about 15 to about 130 psig.

The leaching operation can be carried out in either a batch or a continuous mode. The particular choice of operation will depend upon the leaching time necessary to extract the desired amount of the metal values. In a batch operation, the necessary quantity of calcium oxide, calcium carbonate and/or calcium hydroxide can be introduced initially instead of being added incrementally during the leaching process. The appropriate amount of base can be readily calculated by one skilled in the art based upon the jarosite content of the feed material added to the leach. The initial quantitative addition of the calcium oxide is operationally advantageous since it eliminates the equipment required to add the material incrementally throughout the leaching process as well as the need to monitor the pH of the system. We have found that there is no difference in the final level of the metal values extracted when the calcium oxide is added initially as opposed to incrementally during the leaching operation as long as the final pH of the leaching solution is within the desired range.

At the conclusion of the leaching process, the liquid-solid slurry is separated 7 into solid tails 8 and a liquid leachate 9. This can be accomplished by any known method for solid-liquid separations, although with this type of slurry, it is preferred that the separation be accomplished by filtration accompanied by appropriate washings. Surprisingly, it has been found that slurries from the high temperature leaches filter two to three times faster than the slurries from a leach conducted at 95° C. to 100° C. This is an unexpected advantage of operating at the higher leach temperatures. The solid tails which contain gypsum and iron oxides are discarded. Optionally, a slip stream from the leachate is recycled 10 to the calcium chloride leaching process to allow further concentration of metal values. The remaining leachate liquid is subjected to further processing for recovery of metal values.

The recovery of the metal values can be accomplished by any known method useful for separating such materials. A particular separation scheme is set forth in FIG. 5. The leachate 9 from the calcium chloride leach 6 is contacted 13 with a metal 14 capable of reducing silver. Preferably zinc metal is used although lead is also suitable and the choice is generally a matter of economics. The metal, ordinarily in the form of fine particulates, is contacted with the leachate preferably at a temperature between about 40° C. and about 80° C. The silver cement 15 is separated 17 from the liquid by filtration although centrifugation could also be used. The silver is recovered from the silver cement by conventional means such as smelting.

Figure 7:
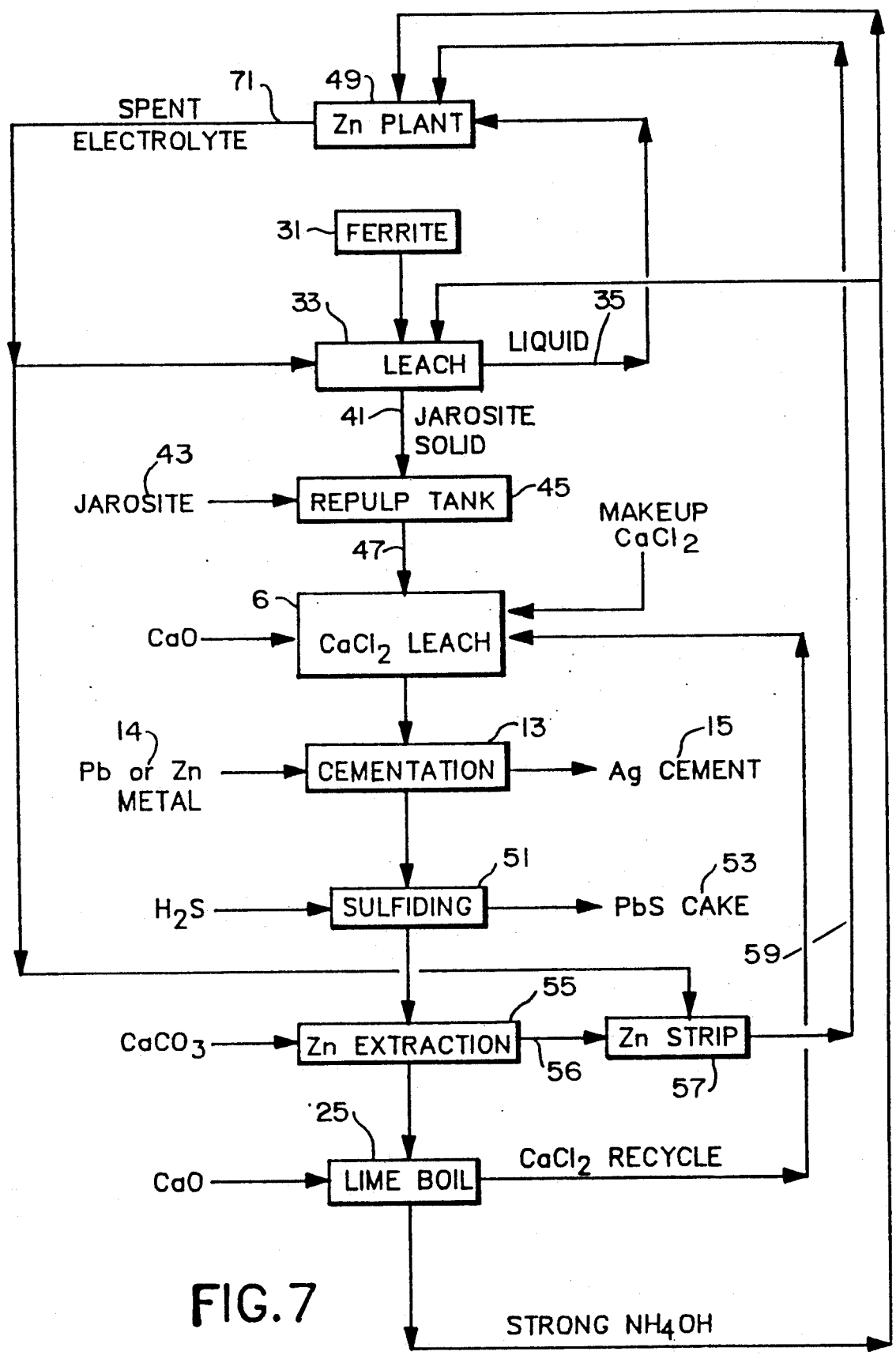
FIG. 7 shows a process flowsheet for metals recovery from ferrite and jarosite in association with a zinc plant.

As shown in FIG. 7, lead can be separated from the liquor from the cementation process by sulfiding 51 with hydrogen sulfide or any appropriate sulfide source to precipitate lead sulfide 53. Ordinarily, greater than about 95 weight percent of the lead is precipitated. The lead sulfide is separated from the liquid by filtration although centrifugation can also be used.

The liquid from the sulfiding step is treated 19 to recover zinc. Solvent extraction and precipitation are preferred methods of separation although any method suitable for recovering zinc 21 from such a stream can be used. The zinc-solvent extraction 55 process, depicted in FIG. 7 and FIG. 8, involves contacting the aqueous solution containing the zinc with an extractant which will bind the zinc and allow its extraction into an organic phase. A preferred extractant is di-2-ethylhexyl phosphoric acid dissolved in an appropriate diluent. In operation, the extractant is mixed with the zinc feed solution. Since the extraction of zinc lowers the aqueous pH, a base such as NaOH, CaO, or $CaCO_3$ can be added to maintain the desired pH. At a pH of between about 2 and 3 the zinc is selectively extracted into an organic phase 56 in contact with the aqueous solution. This organic phase containing the zinc is separated from the aqueous phase and the zinc is then stripped 57 into a strong sulfuric acid solution. The solution 59 containing the zinc can be transported to a zinc plant for recovery of the zinc.

In another process sequence (shown as a part of the scheme in FIG. 8), the liquid from the cementation step is subjected to solvent extraction to remove the zinc as described hereinabove. The raffinate liquor from the zinc solvent extraction is partially neutralized, preferably with calcium oxide, to a pH of between about 8 and 9 to precipitate lead hydroxide. The lead hydroxide solid is removed, for example by filtration 65 or centrifugation and disposed of or the lead can be recovered by known procedures.

The liquid 23 recovered from this separation is subjected to a lime boil 25 by adding lime to provide a pH above about 9 and heating to about the boiling point of the mixture. Ammonia is vaporized and passed through a condensor to provide an ammonium hydroxide stream which can be recycled to the ferrite leach or to the zinc plant to produce ammonium jarosite. The liquid condensate can be neutralized with sulfuric acid to produce ammonium sulfate suitable for fertilizer.

Alternatively (not shown), the zinc can be precipitated as zinc hydroxide by adding calcium oxide to the liquor from the sulfiding process. Sufficient calcium oxide is added to provide a solution pH in the range of about 8 to 10. The precipitated zinc hydroxide is separated by liquid-solid separation means preferably filtration. The recovered zinc hydroxide can be conveyed to a zinc plant for recovery of the zinc.

Figure 8:
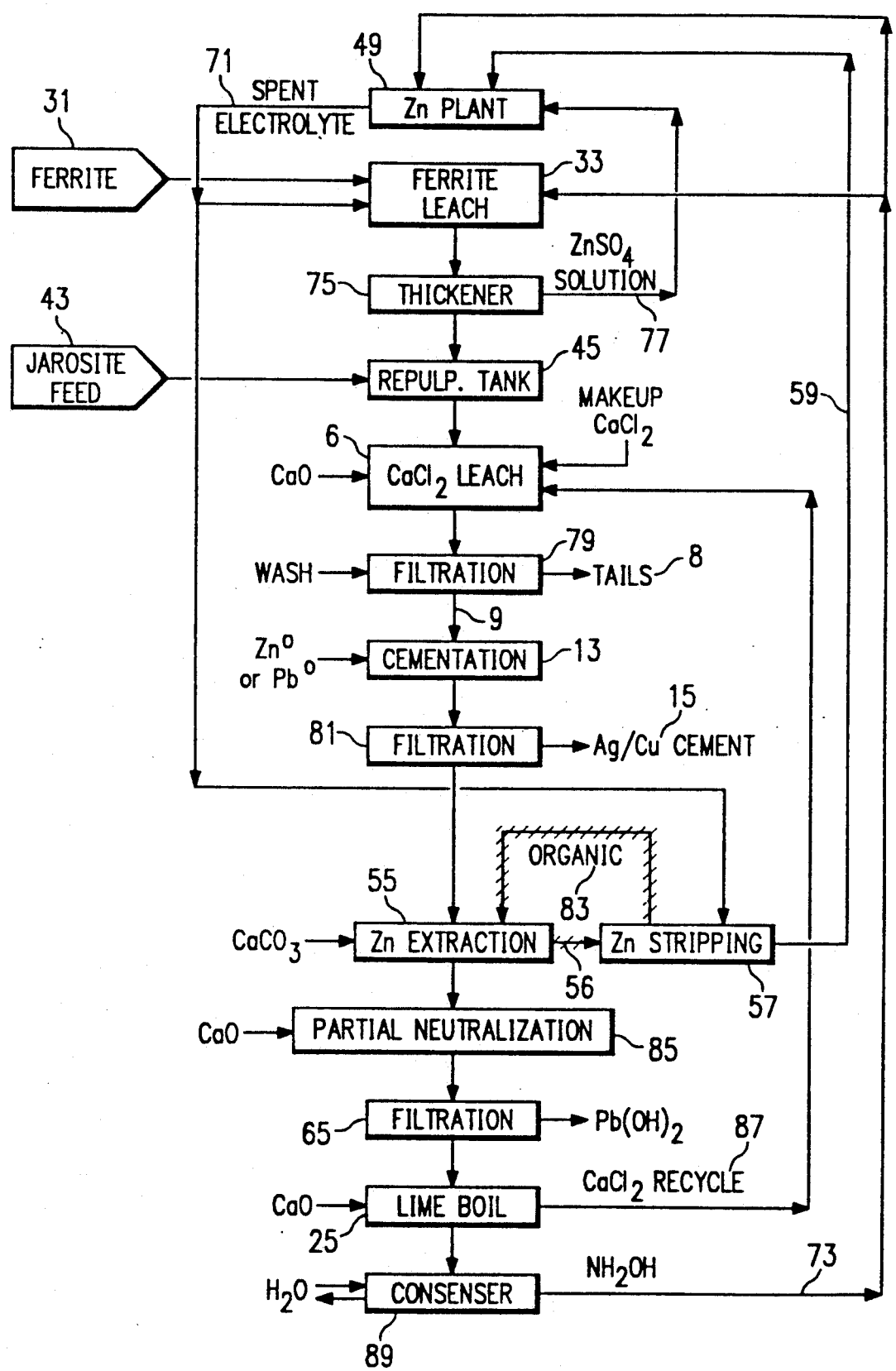
FIG. 8 shows a process flowsheet of a preferred embodiment.

As shown in FIG. 8, the liquor from the zinc separation process is subjected to a lime boil treatment with calcium oxide. This lime boil step is conducted at a temperature effective to form ammonia and calcium chloride commonly above room temperature. Sufficient calcium oxide and/or calcium hydroxide is added to provide a pH of above about 9. This process step provides an ammonia overhead vapor stream and a brine stream containing calcium chloride and/or a precipitate of lead hydroxide. The brine stream is preferably recycled to the calcium chloride leach step to allow reuse of the chloride values. The ammonia, which can be dissolved in water or used directly, is preferably recycled to a zinc plant or to a ferrite preleach process.

In an alternative procedure (not shown), the liquor from the cementation step can be combined with sufficient calcium oxide to cause the combined precipitation of zinc hydroxide and lead hydroxide. Calcium oxide is added to provide a pH in the range of about 8 to 10. The metal hydroxides are separated by usual solid-liquid separation techniques preferably by filtration. These hydroxides can then be returned to a zinc plant for recovery of the zinc. The liquor from the precipitation process is then subjected to a lime boil as discussed hereinabove. The resulting brine solution is preferably recycled to the calcium chloride leach with the ammonium hydroxide formed preferably being recycled to a zinc plant or sold as a by-product.

Figure 6:
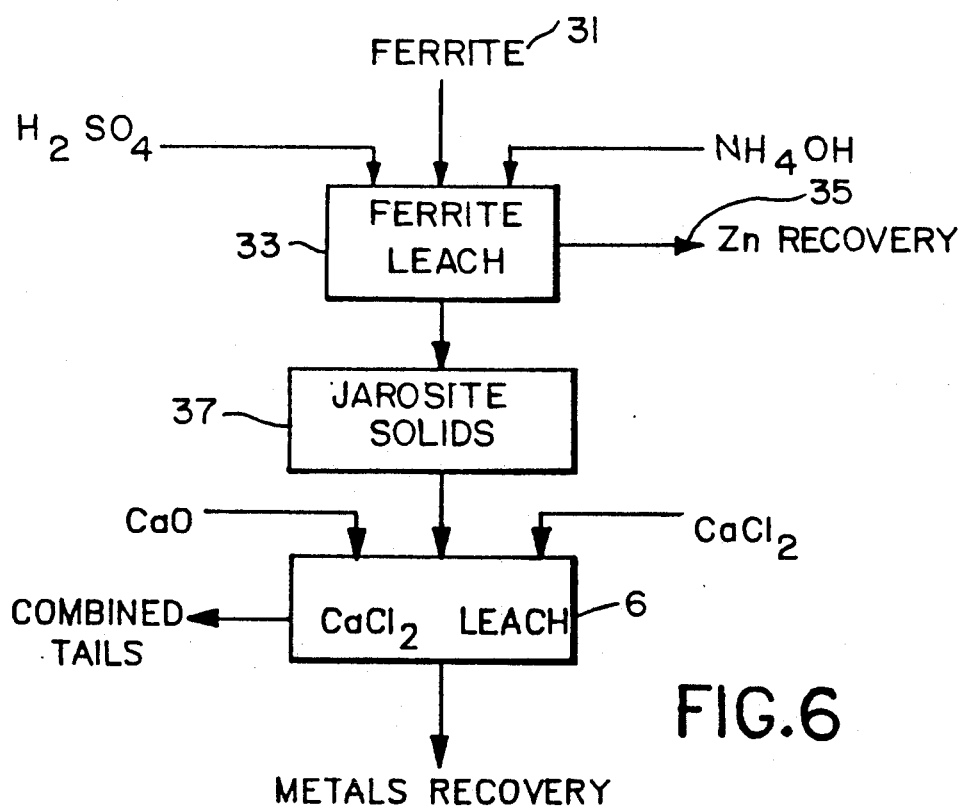
FIG. 6 shows a process flowsheet for a ferrite leach followed by a high temperature calcium chloride leach.

When zinc ferrite is treated, a sulfuric acid ferrite leach operation is used as discussed hereinabove. As shown in FIG. 6, an aqueous slurry of the ferrite solids 31 is combined with sulfuric acid and ammonium hydroxide. Sufficient ferrite solids are added to provide a slurry containing about 30 weight percent ferrite. Sulfuric acid is added to the extent necessary to provide a final acid level of about 10 to about 60 grams per liter. Preferably, the sulfuric acid used is spent electrolyte from a zinc plant. Sufficient ammonia is added to accomplish precipitation of the ammonium jarosite. Suitable ammonium sources include without limitation ammonia, ammonia water, ammonium hydroxide and ammonium salts such as ammonium sulfate. Preferably, the ammonia is received from the lime boil operation described hereinabove. Preferably, ammonium ions are present at the end of the leach to the extent of about 10 g/l to about 20 g/l of the solution. About 15 grams of ammonia per liter of slurry is used in this operation. The ferrite leach 33 is accomplished at a temperature of about 95° C. for a period of about 12 to 24 hours. This resulting slurry is subjected to a thickening liquid-solid separation procedure. The addition of a small amount of "seed" jarosite can be added to aid in the formation of solid jarosite. The liquid 35 from this ferrite leach is rich in zinc and can be conveyed to a zinc recovery process. The solid material 37 is predominantly jarosite which contains zinc and other metal values. This material is conveyed to a calcium chloride leach 6 as described hereinabove.

In FIG. 7 there is shown an embodiment of the instant invention in which the product 41 from a ferrite leach 33 is combined with additional jarosite 43 in a repulp tank 45 and the resulting pulp 47 is fed to a calcium chloride leach 6. The subsequent metal recovery steps have been described in detail hereinabove. Also shown in this embodiment is the movement of various streams to and from a zinc plant 49. The zinc-rich liquid 35 from the ferrite leach is transferred to the zinc plant for recovery of the zinc. Also, the strip liquor from the zinc extraction is transferred to the zinc plant. Ammonia from the lime boil is used in the zinc plant and/or the ferrite leach step to form jarosite. The spent sulfuric acid electrolyte from the zinc plant is used in the ferrite leach and in zinc stripping. As discussed hereinabove, an alternative method of zinc separation which is not shown is the precipitation of zinc hydroxide. This zinc hydroxide can also be conveyed to the zinc plant for recovery of the zinc metal.

In FIG. 8 is shown a preferred process scheme for the treatment of ferrite and/or jarosite wastes. A ferrite containing feed 31 is subjected to a leach 33 by contacting it with sulfuric acid and an ammonium source as described hereinabove. The source of the sulfuric acid is spent electrolyte 71 from a zinc plant 49. The ammonium source is ammonia or ammonium hydroxide 73 recycled from the lime boil 25. A flocculant 75 is added to the slurry and the solids are separated from the liquid. The liquid 77, containing zinc, is conveyed to a zinc plant for zinc recovery. The solids, containing ammonium jarosite and metal values, are transferred to a repulp tank 45 where these solids can be mixed with additional jarosite feed 43 and slurried with a calcium chloride source. The leach mixture 6 is heated to above 110° C. under pressure and stirred. The pH of the leach is adjusted to the desired level by the addition of calcium oxide, calcium carbonate and/or calcium hydroxide. After leaching, the slurry is filtered 79 with washing to separate the solid tails 8 and the leachate 9.

The leachate is contacted 13 with metallic zinc to form a silver/copper cement 15. The cement is removed, preferably by filtration 81, and the silver and copper are purified by standard metallurigical methods. The liquid is mixed 55 with an extractant with the pH of the solution adjusted by adding calcium carbonate. The extractant binds the zinc and allows its extraction into an organic phase. The phases are separated and the zinc-containing organic phase 56 is contacted 57 with spent electrolyte 71 from a zinc plant to strip the zinc from the organic phase into an aqueous phase. The aqueous phase 59 containing the zinc is transferred to a zinc plant for recovery of the zinc. The organic phase 83 containing the barren extractant is recycled to contact fresh zinc-containing solution.

The aqueous phase from which substantially all of the zinc has been removed is contacted with lime 85 to increase the pH to between about 8 and 9 to precipitate lead hydroxide. The solid lead hydroxide is separated from the liquid by filtration 65. The liquid phase is mixed with lime and heated to boiling. The liquid from the lime boil 25 is a calcium chloride-brine solution and is recycled 87 to the calcium chloride leaching step. The vapor containing ammonia is condensed 89 with cold water and the resulting ammonium hydroxide solution is recycled 73 to the zinc plant and/or to the ferrite leach. Any uncondensed vapor can be passed into an acid scrubber using, for example, a sulfuric acid wash to form a solution of ammonium salt such as ammonium sulfate.

The following examples are given for illustrative purposes only and are not to be a limitation on the subject invention.

EXAMPLE 1

Three jarosite feed materials were used in the Examples. Sample 1 was taken from a first zinc plant waste lagoon. Samples 2 and 3 were taken from different locations in a second zinc plant waste lagoon. The assay results are given in Table 1A.

TABLE 1A

| Element, % | Sample 1 | Sample 2 | Sample 3 |
|---|---|---|---|
| Zn | 4.95 | 7.53 | 7.46 |
| Ag oz/T | 7.53 | 12.3 | 11.2 |
| Fe | 27.1 | 22.6 | 19.9 |
| Pb | 2.13 | 6.98 | 7.10 |
| NH$_4$ | 2.04 | 1.01 | 1.20 |
| K | 0.054 | 0.364 | 0.337 |
| Na | 0.122 | 0.162 | 0.156 |
| Cu | 0.32 | 0.3 | 0.347 |
| Mn | 0.362 | 5.17 | 4.47 |
| In | 0.010 | — | 0.008 |

A series of runs were made in which the jarosite feed material was contacted with a leaching solution containing 330 grams per liter calcium chloride, for 5 hours unless otherwise noted. The pH was maintained in the range of 1.8-3.5 by the addition of calcium hydroxide. The amount of solids in the leach was about 16.8 weight percent.

The leaching process was conducted at different temperatures as indicated in Table 1B. When the temperature of the leach solution was at or below the boiling point of the solution, the leach was conducted in conventional glassware. When the leaching temperature was above the boiling point of the solution, the leach was conducted in a 2-liter Parr agitated autoclave.

The leachate was separated from solids by filtration through a Buchner funnel using low vacuum.

TABLE 1B

| Run No. | Leach Temperature, °C | Extraction, % Ag | Pb | Zn |
|---|---|---|---|---|
| Sample 1 Jarosite (5-10 g/l K) | | | | |
| 1 | 95 | 76 | 81 | 49 |
| 2 | 103 (boiling) | 78 | 77 | 47 |
| 3 | 110 | 93 | 89 | 44 |
| 4 | 120 | 96 | 85 | 42 |
| 5 | 130 | 99 | 94 | 48 |
| Sample 3 Jarosite (25 g/l K) | | | | |
| 6 | 95 | 72 | 84 | 28 |
| 7 | 110 | 72 | (62) | 28 |
| 8 | 120 | 73 | (62) | 29 |
| 9 | 130 | 73 | 88 | 29 |
| 10 | 140 | 72 | 89 | 31 |
| 11 | 150 | 74 | 80 | 30 |
| 12 | 180 (1 hr) | 76 | 86 | 37 |
| 13 | 200 (2 hr) | 75 | 84 | 34 |
| 14 | 225 (1 hr) | 75 | 87 | 35 |
| 15[a] | 325 | 74 | 80 | 31 |

[a]Run in the nickel bomb reactor for approximately 5 minutes. Bomb leach extractions are generally lower than comparable autoclave values. Description of nickel bomb reactor in Example 3.

EXAMPLE 2

The effect of potassium on the recovery of metal values from certain feeds is shown in Table 2. The leaching conditions and apparatus of Example 1 were used. The conventional glassware was used for the 95° C. to 103° C. leaches with the Parr autoclave used for the leaches conducted at temperatures greater than 103° C. With Sample 2 feed, the recovery of metal values was significantly reduced when potassium was present. Increasing the leach temperature in Run 18 however, allowed recovery of the metal values even in the presence of potassium. Sample 3 feed showed no potassium effect.

TABLE 2

Conditions: 95-103° C. tests: 330 g/l CaCl$_2$; 4-5 hours; pH 1.8-3.5.
>103° C. tests: autoclave; 330 g/l CaCl$_2$; 1 hour; pH 1.8-3.5.

| Sample No. | Run No. | Leach Temp °C | K in Leach Solution g/l | Extraction, % Ag | Pb | Zn |
|---|---|---|---|---|---|---|
| 1 | 1 | 95 | 5-10 | 76 | 81 | 49 |
|  | 2 | 103 (boiling) | 5-10 | 78 | 77 | 47 |
|  | 3 | 110 | 5-10 | 93 | 89 | 44 |
|  | 4 | 120 | 5-10 | 96 | 85 | 42 |
|  | 5 | 130 | 5-10 | 99 | 94 | 48 |
| 2 | 16 | 95-100 | 0 | 72 | 84 | 41 |
|  | 17 | 95-100 | 5 | 13 | 35 | 27 |
|  | 18 | 180 | 10 | 79 | 88 | (60) |
| 3 | 19 | 95-100 | 0 | 73 | 86 | 34 |
|  | 6 | 95-100 | 25 | 72 | 84 | 28 |
|  | 12 | 180 | 25 | 76 | 86 | 37 |

EXAMPLE 3

A series of runs was made with Sample 3 jarosite to determine the effect of leaching time in atmospheric leaches and in pressurized leaches at temperatures above the boiling point of the leach solution (at 130° C. and 180° C.). The atmospheric leaches were conducted at 95°-100° C. using the procedure of Example 1. The atmospheric results are given in Table 3A. The pressurized leaches were conducted using Samples 1 and 3 in a 500-milliliter reactor fabricated from nickel pipe mounted in a horizontal configuration. Lifters were installed on the internal surface parallel to the axis. The reactor was rotated about its horizontal axis to provide agitation to the reaction mixture. A thermocouple set in a thermowell was inserted into the reaction mixture to monitor the temperature. The contents of the reactor were heated to temperature within about 3 minutes by using external Meker gas burners. The leach mixture was maintained at temperature for the specified time. The reactor was then quenched in water to lower the temperature rapidly. The pressurized results are given in Table 3B.

TABLE 3A

| Run[a] No. | Sample 3 Leaching Time, hours | Extraction, % Ag | Pb | Zn |
|---|---|---|---|---|
| 6[b] | 0.5 | 54 | 44 | 21 |
| 6 | 1.0 | 58 | 56 | 22 |
| 6 | 3.0 | 61 | 79 | 29 |
| 19[c] | 3.0 | 57 | 76 | 30 |
| 6 | 5.0 | 72 | 84 | 28 |
| 19 | 5.0 | 73 | 86 | 34 |
| 19 | 8 | 73 | 82 | 32 |
| 19 | 12 | 75 | 84 | 36 |
| 19 | 24 | 74 | 85 | 33 |

[a]330 g/l CaCl$_2$, pH 1.8-3.5
[b]Run 6 had 25 g/l K
[c]Run 19 had 0 g/l K

TABLE 3B

| Run No. | Leaching Time, minutes | Extraction, % Ag | Pb | Zn |
|---|---|---|---|---|
| Sample 1 Jarosite (130° C.) | | | | |
| 20 | 5 | 25 | 9.4 | 32 |
| 21 | 10 | 53 | 24 | 33 |

TABLE 3B-continued

| Run No. | Leaching Time, minutes | Extraction, % Ag | Pb | Zn |
|---|---|---|---|---|
| 22[a] | 10 | 68 | 69 | 42 |
| 23 | 20 | 77 | 76 | 46 |
| 5 | 30 (autoclave) | (84) | (80) | (45) |
| Sample 3 Jarosite (180° C.)[b] | | | | |
| 24[c] | 0 | 72 | 57 | 28 |
| 25 | 2.5 | 69 | 69 | 31 |
| 26 | 5 | 72 | 62 | 31 |
| 27 | 10 | 69 | 78 | 32 |
| 28 | 30 | 71 | 77 | 33 |

[a]20% solids leach. Other leaches: 16.8% solids.
[b]Nickel bomb reactor, 330 g/l CaCl$_2$, pH 1.8-3.5, 25 g/l K.
[c]Heat to temperature, cool immediately. Approximately 3 min heat up.

EXAMPLE 4

A series of runs was made using Sample 1 jarosite to determine the effect of temperature on the amount of solids or pulp density which can be effectively leached. The leach was conducted using 330 g CaCl$_2$/l, at 95 to 100° C., for 6 hours, and 1.8 to 3.5 pH. The results are given in Table 4A.

Sample 1 and Sample 3 jarosite materials were leached in the nickel bomb reactor of Example 3 with 330 g CaCl$_2$/l, pH 1.8-3.5 at temperature for 10 minutes. The leach of Sample 1 also contained 25 g/l K. These residues were washed with hot CaCl$_2$ brine solution (330 g CaCl$_2$/l). The effect of a single wash is shown in Table 4B. The effect of cumulative washings on two residues is given in Table 4C.

TABLE 4A

| Pulp Density | Solubilized, % Zinc | Silver | Iron | Lead |
|---|---|---|---|---|
| 30% solids | 49 | 25 | 1 | 52 |
| 30% solids | 43 | 38 | 1 | 53 |
| 20% solids | 49 | 76 | 1 | 90 |
| 15% solids | 46 | 68 | 1 | 95 |
| 10% solids | 46 | 72 | 1 | 90 |

TABLE 4B

| Run No. | Initial Leach % Solids[a] | Extraction, % Ag Original | Rewash | Pb Original | Rewash | Zn |
|---|---|---|---|---|---|---|
| Sample 1 jarosite (130° C.) | | | | | | |
| 22 | 20 | 68 | 83 | 69 | 79 | 42 |
| 29 | 30 | 68 | 84 | 60 | 78 | 37 |
| 30 | 35 | 66 | 82 | 52 | 72 | 38 |
| 31 | 40 | 69 | 82 | 57 | 77 | 40 |
| 32 | 45 | Slurry too thick to agitate | | | | |
| 33 | 50 | Slurry too thick to agitate | | | | |
| Sample 3 jarosite (180° C.) | | | | | | |
| 27 | 16.8 | 69 | — | 78 | — | 32 |
| 34 | 20 | 71 | — | 84 | — | 33 |
| 35 | 30 | 70 | 74 | 29 | 70 | 30 |
| 36 | 35 | 66 | 72 | 18 | 83 | 31 |
| 37 | 40 | 70 | 76 | 19 | 83 | 31 |
| 38 | 45 | Slurry too thick to agitate | | | | |
| 39 | 50 | Slurry too thick to agitate | | | | |

[a]% solids is the weight % of jarosite feed in the initial leach slurry. Ca(OH)$_2$ added to maintain the leach pH is not included.

TABLE 4C

| Filter Cake | Wash Cumulative Solution Displacements | Cumulative Washing, Efficiency, % Ag | Zn |
|---|---|---|---|
| Sample 1 residue | 0 | 0 | 0 |
| | 0.6 | 42.8 | 47.1 |

TABLE 4C-continued

| Filter Cake | Wash Cumulative Solution Displacements | Cumulative Washing, Efficiency, % Ag | Zn |
|---|---|---|---|
| | 1.2 | 78.5 | 83.6 |
| | 1.9 | 89.3 | 91.2 |
| Sample 3 residue | 0 | 0 | 0 |
| | 1.6 | 66.0 | 60.0 |
| | 3.25 | 96.9 | 94.1 |
| | 4.9 | (100) | 98.6 |
| | 6.6 | (100) | 99.4 |

EXAMPLE 5

Closed-cycle process simulation runs were made. Sample 3 feed was used in Runs 40 and 41 and Sample 1 feed was used in Run 42. The same CaCl$_2$ leach procedure was followed as in Example 1 except the leach time for each was 30 minutes. The temperature for Run 40 was 180° C. and was 130° C. for Runs 41 and 42. Each leachate from the CaCl$_2$ leaches was separated from solid residue by filtration. In Run 40, a stainless steel autoclave was used which might have resulted in some cementation of silver during the leach. The "Cycle No.", e.g. C-1, refers to the number of times spent brine was recycled to the CaCl$_2$ leach step. Results are given in Table 5A.

The filtrates were cemented with zinc to recover silver and copper. The cementation was accomplished by bringing the filtrate to temperature in a beaker. Zinc dust was added and the slurry was agitated for one hour. The resulting slurry was filtered and washed with three 50-ml portions of deionized water. The effect of reaction time and zinc requirement on the recovery of metals by cementation with zinc powder is shown in Table 5B.

TABLE 5A

| Run Description | Liquor From Run No. (Cycle) | Stoichiometric Zn Addition for Ag and Cu (II) Cementation | Cementation, % Ag | Cu | Pb | Barren Solution, g/l Ag | Cu |
|---|---|---|---|---|---|---|---|
| A | 40 | 5.9 | 84 | 42 | — | 0.004 | 0.042 |
| B | 41, (C-1) | 2.8 | 60[a] | 98 | 18 | 0.004 | 0.001 |
| C | 41, (C-2) | 14.2 | 90 | 66[a] | 3 | 0.001 | 0.002 |
| D | 41, (C-3) | 0.7 | 95 | 24 | 0.1 | 0.001 | 0.002 |
| E | 42, (C-1) | 1.2 | 94 | 99.4 | 0.8 | 0.002 | 0.002 |
| F | 42, (C-2) | 1.3 | 98 | 99 | 21 | 0.001 | 0.004 |
| G | 42, (C-3) | 7.3 | 98 | 97 | 99.6[b] | 0.001 | 0.002 |

Other conditions: Temperature 60° C.
Time 1 hour
pH 2.6-5.0
[a]Low value due to low initial concentration in feed to cementation.
[b]Anomalous value.

TABLE 5B

| Stoichiometric Zn for Ag & Cu | Reaction Time, minutes | Cementation, % Ag | Cu | Barren Solution, g/l Ag | Cu |
|---|---|---|---|---|---|
| 1.0 | 15 | 62 | 73 | 0.008 | 0.042 |
| | 30 | 71 | 70 | 0.006 | 0.046 |
| | 60 | 86 | 66 | 0.003 | 0.051 |
| 1.5 | 15 | 67 | 68 | 0.007 | 0.048 |
| | 30 | 76 | 68 | 0.005 | 0.049 |
| | 60 | 90 | 74 | 0.002 | 0.040 |
| 2.0 | 15 | 71 | 70 | 0.006 | 0.045 |
| | 30 | 81 | 77 | 0.004 | 0.035 |
| | 60 | 90 | 85 | 0.002 | 0.023 |

Conditions: Temperature: 60° C.
Feed Solution: 0.021 g/l Ag, 0.152 g/l Cu, 3.15 g/l Pb, 6.3 g/l Zn, 0.012 g/l Fe

TABLE 5B-continued

|  |  |
|---|---|
|  | (from autoclave leach of Sample 3, 330 g $CaCl_2$/l, 180° C. for 1 hour, 25 g/l K, 25.1 wt. % solids, pH 1.8-3.5). |
| Zinc Requirement: | 1.0 stoich. = 0.163 g Zn/l (0.0064 g/l for Ag, 0.157 g/l for Cu). |
| Final pH: | 5.1–5.2 |

EXAMPLE 6

Filtrates from the zinc cementations of Example 5 were each brought to temperature and contacted with hydrogen sulfide gas sufficient to provide a solution emf below 0.0 millivolts versus a standard calomel electrode (SCE). This quantity of $H_2S$ resulted in final solution pH's of 0.0 to 0.2. After the indicated reaction time, the slurry was filtered and the solid was washed with three 50-ml portions of deionized water.

TABLE 6

| Designation | From Run No. (Cycle) | Run Time, minutes | Solution emf, mv Initial | Solution emf, mv Final | Final pH | Pb Precipitation % |
|---|---|---|---|---|---|---|
| A | 40 | 15 | +327 | −74 | 1.1 | 38 |
| B | 41, (C-1) | 15 | +297 | −26 | 0.65 | 48 |
| C | 41, (C-2) | 30 | +290 | −25 | 0.20 | 72 |
| D | 41, (C-3) | 30 | +348 | −30 | — | 99.6 |
| E | 42, (C-1) | 30 | +246 | +0 | — | 42 |
| F | 42, (C-2) | 15 | +304 | −3 | 0.28 | 46 |
| G | 42, (C-3) | Data not applicable. | | | | |

Other conditions Temperature: 60° C.
Feed solution pH: 3.5-5.0

EXAMPLE 7

A calcium chloride leach of Sample 3 feed was conducted with a leach solution of 330 g/l $CaCl_2$ at an initial solids of 25.1 weight percent at a temperature of about 180° C. (±3° C.) for one hour. The target pH was 1.8-3.5 with lb/ton of feed of $Ca(OH)_2$ added initially to maintain the pH within the target range. The leach mixture was filtered and the leachate solution, maintained at 22° C., was mixed with hydrated lime, $Ca(OH)_2$, to adjust the pH to the indicated values. The amounts of zinc and lead hydroxides precipitated at the particular pH was determined. Results are given in Table 7A.

TABLE 7A

| pH | Analysis, g/l Zinc | Analysis, g/l Lead | Precipitation, % Zinc | Precipitation, % Lead |
|---|---|---|---|---|
| Feed 2.58 | 8.68 | 3.31 | 0.0 | 0.0 |
| 3.0 | 9.33 | 2.83 | 0.0 | 14.5 |
| 4.0 | 9.64 | 2.98 | 0 | 10.0 |
| 5.0 | 9.58 | 2.98 | 0 | 10.0 |
| 6.0 | 10.2 | 3.28 | 0 | .9 |
| 7.0 | 9.7 | 3.13 | 0 | 5.4 |
| 7.5 | 5.4 | 1.4 | 37.8 | 57.7 |
| 8.0 | 2.06 | .125 | 76.3 | 96.2 |
| 9.0 | 1.89 | .055 | 78.2 | 98.3 |
| 9.5 | 1.47 | .441 | 83.1 | 86.7 |
| 10.0 | 1.47 | 2.15 | 83.1 | 35.0 |
| 10.7 | 2.06 | 2.11 | 76.3 | 36.3 |

The filtrates from Example 6 were each mixed with hydrated lime to adjust the pH to a target final pH of 9.5. The temperature was maintained at about 60° C. for 15 minutes. The solid zinc hydroxide was separated by filtration using a Buchner funnel. The solids were washed with three 50-ml portions of deionized water and dried overnight at 100° C. prior to assay. The results are given in Table 7B.

TABLE 7B

| Test Designation | From Test No. | $Ca(OH)_2$ Required g/l | Feed pH | Zinc Assay, g/l Feed | Zinc Assay, g/l Final | Zinc Precipitation % |
|---|---|---|---|---|---|---|
| A | 40 | 19.8 | 0.55 | 5.39 | $(1.15)^a$ | (80) |
| B | 41, (C-1) | 7.2 | 1.0 | 4.77 | 1.47 | 69 |
| C | 41, (C-2) | 18.0 | 0.55 | 5.16 | 1.00 | 80 |
| D | 41 (C-3) | — | 0.40 | 4.98 | 0.88 | 82 |
| E | 42, (C-1) | 30.0 | 0.30 | 6.24 | 1.18 | 81 |
| F | 42, (C-2) | — | 0.30 | 7.47 | 2.21 | 70 |
| G | 42, (C-3) | 19.7 | 1.37 | 3.35 | 1.89 | 62 |

$^a$Value calculated from solids assays.

EXAMPLE 8

Filtrate from Example 7 was mixed with calcium hydroxide and heated at boil. The ammonia evolved was recovered in the distillate or by condensing or scrubbing the off-gas. The pH was maintained between about 8.8 and 10.5 with $Ca(OH)_2$. Results showing essentially complete $NH_3$ recovery is possible by boiling the solution at the indicated pH are provided in Table 8. Some of the zinc or lead present in the feed solution precipitated during the lime boil step and those values are given in Table 8 as residuals precipitated.

TABLE 8

| Designation | From Run No. (Cycle) | Target pH | $Ca(OH)_2$ Required, g/l | Volume Reduction % | $NH_4$ Assay, g/l Feed | $NH_4$ Assay, g/l Final | $NH_4$ Assay, g/l Distillate | $NH_4$ Volatilized % | Residuals Precipitated, % Zn | Residuals Precipitated, % Pb |
|---|---|---|---|---|---|---|---|---|---|---|
| A | 40 | 10.5 | — | 33 | 1.76 | 0.01 | 3.02 | 99.8 | 48 | 5 |
| B | 41, (C-1) | 10.5 | 3.2 | 27 | 1.47 | — | 3.94 | 100 | 83 | 10–12 |
| C | 41, (C-2) | 8.75 | 2.4 | 6.8 | — | — | 11.4 | (100) | 4 | 1 |
| D | 41, (C-3) | 8.75 | — | — | not assayed | | | — | — | — |
| E | 42, (C-1) | 8.75 | 0.0 | 8.8 | 2.94 | 1.06 | 21.1 | 72 | 48 | 1 |
| F | 42, (C-2) | 10.5 | 1.9 | 10 | not assayed | | | — | 81 | 7 |
| G | 42, (C-3) | 8.60 | 2.0 | 4.3 | not assayed | | | — | 74 | 4 |

EXAMPLE 9

Ammonia recovery into a high concentration solution from a $CaCl_2$ solution by boiling with $Ca(OH)_2$ was determined by preparing a synthetic feed solution. This solution contained 450 g/l $CaCl_2$ and 50 g/l $NH_3$ as $NH_4Cl$. A volume of solution was placed in a sealed distillation apparatus with provision for incremental sampling of the distillate. Sufficient $Ca(OH)_2$ was added to liberate 70% of the contained $NH_3$ and the distillation was performed with periodic collection and $NH_3$ analyses of the distillates. The test data are summarized in Table 9. The distillation time of 43 minutes produced a 27% volume reduction and a 53% recovery of $NH_3$ in the distillate (75% of the theoretical recovery based on the Ca(OH)$_2$ addition). Initial distillate contained over 300 g/l NH$_3$, demonstrating that the lime boil step can recover a high concentration NH$_3$ product. The usable NH$_3$ concentration should be in the 200 g/l range as shown by the Distillate No. 1+2+3.

TABLE 9

| Product | Time minutes | Volume ml | NH$_3$ g/l | CaCl$_2$ g/l | NH$_3$ Amount, g | Distillate Volume, % of Feed Increment | Distillate Volume, % of Feed Cumulative | NH$_3$ Evolved, % of Theoretical Increment | NH$_3$ Evolved, % of Theoretical Cumulative |
|---|---|---|---|---|---|---|---|---|---|
| Feed to lime boil | 0 | 500 | (50) | (450) | 25.0 | — | — | 0 | 0 |
| Distillate No. 1 | 7 | 13.2 | 305 | — | 4.02 | 2.6 | 2.6 | 23.0 | 23.0 |
| Distillate No. 2 | 14 | 17.2 | 173 | — | 2.97 | 3.4 | 6.1 | 17.0 | 40.0 |
| Distillate No. 3 | 20 | 17.5 | 146 | — | 2.55 | 3.5 | 9.6 | 14.6 | 54.5 |
| Distillate No. 4 | 29 | 27.0 | 70 | — | 1.88 | 5.4 | 15.0 | 10.7 | 65.2 |
| Distillate No. 5 | 30 | 29.0 | 37 | — | 1.08 | 5.8 | 20.8 | 6.2 | 71.4 |
| Distillate No. 6 | 43 | 30.5 | 20 | — | 0.62 | 6.1 | 26.9 | 3.5 | 75.0 |
| Distillate total | | 134.4 | | | 13.12$^a$ | | | | |
| Depleted feed | | 363 | — | (737)$^b$ | | | | | |
| Overall total | | 497 | | | | | | | |

$^a$Sufficient Ca(OH)$_2$ was added to volatilize 17.5 g NH$_3$ (100% efficiency); therefore, net efficiency after 43 minutes was 75.0% (13.12/75 × 100).
$^b$Calculated value includes CaCl$_2$ formed from Ca(OH)$_2$ in lime boil.

EXAMPLE 10

A zinc ferrite waste was subjected to simultaneous leach-jarosite precipitation. The ferrite was assayed and found to contain the following components in weight percent: Zn, 13.0; Fe, 33.4; Pb, 0.325; NH$_4$, 1.12; K, 0.095; and Na, 0.104. Silver was present in the amount of 5.06 ounces per ton of waste.

The following procedure was used to leach the solid ferrite waste. The ferrite was mixed with H$_2$SO$_4$ (150 g/l H$_2$SO$_4$) and (NH$_4$)$_2$SO$_4$ at 20 percent weight/weight solids and heated at 90°–95° C. The H$_2$SO$_4$ was maintained at the target level indicated in Table 10A by the periodic addition of H$_2$SO$_4$ solution (150 g/l H$_2$SO$_4$). The mixture was agitated for 24 hours with samples taken periodically as indicated in Table 10B. The slurry was filtered to remove solids and the leachate was analyzed with the results given in Table 10B.

TABLE 10A

| Variable conditions | | Run No. 43 | Run No. 44 | Run No. 45 | Run No. 46 | Run No. 47 |
|---|---|---|---|---|---|---|
| Leach solution | | | | | | |
| Initial H$_2$SO$_4$. | g/l | 100 | 100 | 100 | 150 | 100 |
| | lb/ton | 750 | 750 | 750 | 1125 | 750 |
| Initial (NH$_4$)$_2$SO$_4$. | g/l | 50 | 150 | 84 | 84 | 84 |
| | lb/ton | 375 | 1125 | 625 | 625 | 625 |
| Target H$_2$SO$_4$. | g/l | 30 | 30 | 22 | 58 | 30 |

TABLE 10B

| Element | Time, hr | Run No. 43 | Run No. 44 | Run No. 45 | Run No. 46 | Run No. 47 |
|---|---|---|---|---|---|---|
| | | | | % Extracted | | |
| Zn | 1 | 43 | 28 | 58 | 38 | 33 |
| | 4 | 57 | 45 | 73 | 58 | 51 |
| | 8.5 | 60 | 53 | 81 | 76 | 59 |
| | 11.5 | 66 | 53 | 82 | 83 | 64 |
| | 24 | 80 | 65 | 89 | 89 | 75 |
| Ag | 1 | 2.9 | 6.2 | 5.2 | 5.2 | 11 |
| | 4 | 4.4 | 9 | 4.4 | 4.8 | 4 |
| | 8.5 | 5.1 | 6.6 | 4.7 | 5.8 | 4 |
| | 11.5 | 6.2 | 5.1 | 3.3 | 6 | 4 |
| | 24 | 1.8 | 2 | 1.8 | 2.3 | 1 |
| Fe | 1 | 17 | 17 | 34 | 18 | 18 |
| | 4 | 6.8 | 8.8 | 20 | 12 | 8 |
| | 8.5 | 2.9 | 3.8 | 12 | 16 | 6 |
| | 11.5 | 3.5 | 3 | 9.2 | 16 | 5 |
| | 24 | 2.7 | 2.6 | 5 | 15 | 2 |

TABLE 10B-continued

| Element | Time, hr | Run No. 43 | Run No. 44 | Run No. 45 | Run No. 46 | Run No. 47 |
|---|---|---|---|---|---|---|
| | | | | % Extracted | | |
| Pb | 1 | 0 | 4.4 | 0 | 0 | 4 |
| | 4 | 1.5 | 4.7 | 1.9 | 0 | 2 |
| | 8.5 | 0 | 0 | 0.5 | 0 | 2 |
| | 11.5 | 0 | 3.3 | 0 | 0 | 2 |
| | 24 | 0 | 0 | 0 | 0 | 2 |

EXAMPLE 11

Residues from Runs 45 and 45 of Example 10 were leached with CaCl$_2$ at 95°–100° C. (45a and 46a) and 105° C. (45b and 46b). The procedure of Example 1 was used to leach the residue from the ferrite leach. The results are presented in Tables 11A and 11C.

TABLE 11A

| Element | Time, hr | Run No.: 45a | Run No.: 45b |
|---|---|---|---|
| | | Extractions, % | |
| Zn | 1 | 11 | 52 |
| | 3 | 7.4 | 36 |
| | 5 | 8.3 | 38 |
| Ag | 1 | 22 | 99 |
| | 3 | 19 | 98 |
| | 5 | 24 | 98 |
| Fe | 1 | 0.1 | 0.5 |
| | 3 | 0 | 0 |
| | 5 | 2.2 | 0.4 |
| Pb | 1 | 18 | 54 |
| | 3 | 4.2 | 50 |
| | 5 | 0 | 35 |

The recovery for the overall extraction, i.e. the ferrite extraction (given in Table 10B) and the CaCl$_2$ extraction (given in Table 11A at two temperatures) for Run 45 are given in Table 11B.

TABLE 11B

| 5 hour Extractions | Leach(45a) | | | | Leach(45b) | | | |
|---|---|---|---|---|---|---|---|---|
| Element | Zn | Ag | Fe | Pb | Zn | Ag | Fe | Pb |
| Extractions % | | | | | | | | |
| Ferrite Leach | 89 | 1.8 | 5 | 0 | 89 | 1.8 | 5 | 0 |
| CaCl$_2$ Leach | 8.3 | 24 | 2.2 | 0 | 38 | 98 | 0.4 | 35 |
| Overall extraction, % | 90 | 25 | 7 | 0 | 93 | 98 | 5 | 35 |

TABLE 11C

| Test No. Element | Time, hr | 46a | 46b |
|---|---|---|---|
| | | Extractions, % | |
| Zn | 1 | 9.5 | 3.9 |
| | 3 | 23 | 37 |

TABLE 11C-continued

| Test No. Element | Time, hr | 46a | 46b |
|---|---|---|---|
| | | Extractions, % | |
| | 5 | 23 | 43 |
| Ag | 1 | 8.4 | 14 |
| | 3 | 41 | 92 |
| | 5 | 71 | 92 |
| Fe | 1 | 1.4 | 0.8 |
| | 3 | 1.2 | 0 |
| | 5 | 0.2 | 0.2 |
| Pb | 1 | 18 | 6.2 |
| | 3 | 4.2 | 54 |
| | 5 | 0 | 39 |

The recovery for the overall extraction, i.e. the ferrite extraction (given in Table 10B) and the $CaCl_2$ extraction (given in Table 11C at two temperatures) for Run 46 are given in Table 11D.

TABLE 11D

| 5 hour Extractions | Leach(46a) | | | | Leach(46b) | | | |
|---|---|---|---|---|---|---|---|---|
| Element | Zn | Ag | Fe | Pb | Zn | Ag | Fe | Pb |
| Extractions % | | | | | | | | |
| Ferrite Leach | 89 | 2.3 | 15 | 0 | 89 | 2.3 | 15 | 0 |
| $CaCl_2$ Leach | 23 | 71 | 0.2 | 0 | 43 | 92 | 0.2 | 39 |
| Overall extraction, % | 92 | 72 | 15 | 0 | 94 | 92 | 15 | 39 |

EXAMPLE 12

Filtration rate determinations were performed on final slurries from 15 of the jarosite leach tests. The filtration data are summarized in Table 12. Rates were determined using an Eimco 0.1-ft² vacuum filter leaf apparatus, fitted with a medium-weave polypropylene filter cloth. The apparatus was top-loaded with leach slurry and 18 to 22 inches Hg of vacuum was applied. The filter cakes were washed first with hot $CaCl_2$ brine followed by water, and the washing rates determined. The anomalously high wash rates of Runs 48, 49, and 50 probably are due to cake cracking (channeling) and the values are not included in the group averages.

The filtration rate averages in Table 12 show that the elevated temperature leach slurries, with solids rates of 80 to 230 lbs/ft²/hour, filter two to three times faster than the slurries from 95°–100° C. leaching. Two of the leach slurries were flocculated with Percol 351 prior to filtration. Flocculant doses of approximately 200 ppm (solids basis) were required to coagulate the slurry solids. The flocculated filtration Runs 51 and 52, produced inconsistent results as shown in Table 12.

TABLE 12

| | Filtration Rates | | | | |
|---|---|---|---|---|---|
| Run No. | Solid[a] | Filtrate[b] | Brine[b] Wash | $H_2O$[b] Wash | Cake Thickness (Inches) |
| 95–100° C. Leaches | | | | | |
| 53 | 9.6 | 4.0 | — | — | ⅛ |
| 54 | 50 | 24 | 7.0 | 2.1 | ⅛ |
| 51 | 99 | 30 | 10.6 | 9.0 | 3/16 |
| 55 | 31 | 9.3 | 3.2 | 6.0 | ⅛ |
| 52 | 31 | 9.5 | 3.5 | 3.6 | ⅛ |
| 1 | 44 | 18 | 4.6 | 4.5 | 5/16 |
| 50 | 81 | 42 | (32) | (30) | 3/16 |
| Average (excluding Run 53) | 56 | 22 | 5.8 | 5.0 | 3/16 |
| 130° C. Autoclave Leaches | | | | | |
| 56 | 228 | 95 | 16 | 16 | 5/16 |
| 48 | 83 | 43 | 31 | 20 | ⅛ |
| 57 | 91 | 35 | 6.8 | 5.9 | ⅛ |
| 58 | 120 | 42 | 13 | 15 | 3/16 |
| 59 | 130 | 54 | 5.8 | 5.8 | ⅛ |
| 5 | 203 | 83 | 7.9 | 6.7 | 3/16 |
| Average | 142 | 59 | 9.9 | 9.9 | 3/16–⅛ |
| 180 and 225° C. Leaches | | | | | |
| 49 | 111 | 44 | 21 | 27 | ⅛ |
| 60 | 75 | 30 | 7.3 | 11 | ⅛ |

[a]Solids filtration rate units: lbs/ft²/hour.
[b]Liquid filtration rate units: gal/ft²/hour.

Example 13

Calcium carbonate was used for pH control in a leach of Sample 3 feed. The leach was conducted for 10 minutes at 180° C. in the nickel bomb reactor described in Example 3. The run was made under the following conditions and the results are given in Table 13.
Feed : Sample 3
Leach Solution 330 g/l $CaCl_2$, Sp.Gr. 1.24,(6.0 N Cl)
K in Solution : 25 g/l initial
Initial % Solids : 20.0% (wt)
Target Leach pH : 1.8–3.5
$CaCO_3$ required: 283 lb/ton, added initially (Equiv. to 210 lb/ton Ca(OH)₂)
Temperature : 180° C. (performed in nickel bomb reactor)
Heat-up Time : 3.5 minutes
Time : 10 minutes
Final Slurry pH : 5.0

TABLE 13

| Extraction*, % | | | |
|---|---|---|---|
| Zn | Ag | Fe | Pb |
| 25.6 | 53.2 | 0.2 | 43.6 |

*metal extractions were calculated from feed and residue assays.

EXAMPLE 14

Several leaches were conducted at different chloride levels. Leach solutions of 1.8 normal, 6 normal and 10 normal chloride were used. The conditions were similar to those of Example 1. The results are given in Table 14.

TABLE 14

| Leach Solution g/l $CaCl_2$ Feed | 100 (1.8 $\underline{N}Cl^-$) Sample 1 | 330 (6 $\underline{N}Cl^-$) Sample 2 | 550 (10 $\underline{N}Cl^-$) Sample 2 |
|---|---|---|---|
| Extraction, % | | | |
| Ag | 15 | 70 | 74 |
| Pb | 8 | 84 | 89 |
| Zn | 38 | 41 | 42 |

EXAMPLE 15

A direct recycle of leach filtrate to the next stage of leaching was conducted to determine the effect of recycle and impurities build-up on the recovery of values. Five leach cycles were conducted using Sample 3 as feed. The first three cycles used the strongly agitated 2-liter autoclave, while the final two stages were performed in the less well agitated nickel bomb reactor. The chloride concentration of the solution was determined before and after each cycle and was maintained at 6 normal Cl (330 g/l $CaCl_2$) by addition of $CaCl_2$, if required. The 16.8% solids leaches were performed for one hour at 180° C. and a pH of 1.8 to 4.0 by initial addition of $Ca(OH)_2$. The leach filtrate from one cycle was advanced to the next cycle with no intervening solution treatments other than reestablishing 6 $\underline{N}$ Cl concentration, if required.

The results in Table 15 show a steady decrease in the apparent Pb extractions with leach cycling. From cycle 1 to 4, the concentration of Pb in solution increased from 15 to 45 g/l (calculated), which approaches Pb saturation in 6 $\underline{N}$ $CaCl_2$ brine at 50° to 70° C. Leach slurries were cooled to this temperature range prior to removal from the reactor and filtration. It was found that the reduced Pb extractions in cycles two through five were due to saturation of the cooled solutions, causing $PbCl_2$ to crystallize in the residue solids. The standard residue washing procedure, two to three cake displacements with 80° C. $CaCl_2$ brine followed by an equal amount of water, was not effective in totally removing the $PbCl_2$ from the residues, thus producing low extraction values.

The true leach cycle extractions for Pb ("Pb-corr" column in Table 15) were determined by repulping the residues in 80° to 90° C. $CaCl_2$ to dissolve the residual $PbCl_2$ prior to reassay of the solids. The corrected Pb extractions show that leach cycling does not affect the efficiency of the $CaCl_2$ leach significantly, provided that the leach slurry is filtered and washed under conditions (temperature and wash volume) which assure complete dissolution of marginally soluble species such as $PbCl_2$.

Example 16

A process simulation using closed-cycle steps was performed using Sample 1 as feed. The following process steps were included: $CaCl_2$ leaching, Ag/Cu cementation with zinc, Pb precipitation as sulfide, Zn precipitation as hydroxide, $NH_3$ evolution by lime boil, and recycle of the processed $CaCl_2$ solution to the next stage of leaching. The values (Ag, Pb, Zn) were removed from the leach solutions prior to recycle to the next leach. The results are given in Table 16.

TABLE 16

| Process Step | Cycle No. | Zn | Ag | Pb | Cu | Fe | $NH_4$ |
|---|---|---|---|---|---|---|---|
| | | Extraction, %: | | | | | |
| $CaCl_2$ Leach | 1 | 46 | 94 | 94 | 47 | 13 (?) | |
| | 2 | 48 | 97 | 92 | 51 | 0.01 | |
| | 3 | 38 | 96 | 61$^a$ | 18 | 0.01 | |
| | Average | 44 | 96 | 82 | 39 | 4 | |
| | Highest | 48 | 97 | 94 | 51 | 0.01 | |
| | | Precipitation, %:$^b$ | | | | | |
| Ag/Cu Cementation | 1 | — | 94 | 0.8 | 99 | | |
| | 2 | — | 98 | 21 | 99 | | |
| | 3 | | 98 | 99.6 | 97 | | |
| | Average | | 97 | 41 | 98 | | |
| | Highest | | 98 | 99.6 | 99 | | |
| | | Precipitation, %:$^b$ | | | | | |
| Lead Precipitation | 1 | — | 22 | 42 | 84 | | |
| | 2 | — | 5 | 46 | 53 | | |
| | 3 | | 0 | 0 | 0 | | |
| | Average (excluding Cycle 3) | | 13 | 44 | 68 | | |
| | Highest | | 22 | 46 | 84 | | |
| | | Precipitation, %:$^b$ | | | | | |
| Zinc Precipitation | 1 | 81 | — | 55 | — | | |
| | 2 | 70 | — | 0.4 | — | | |
| | 3 | 62 | — | 9 | — | | |
| | Average | 71 | | 22 | | | |
| | Highest | 81 | | 55 | | | |
| | | Precipitation, %: | | | | Evolution, % | |
| Lime Boil | 1 | 48 | — | 0.6 | — | | 72 |
| | 2 | 81 | — | 7 | — | | — |
| | 3 | 74 | — | 4 | — | | — |
| | Average | 68 | | 4 | | | — |
| | Highest | 81 | | 7 | | | 72 |

$^a$Corrected value after rewash of residue. Extraction calculated from original residue (incompletely washed) was 12.0%.
$^b$% of specie in inlet liquor to particular process step.

It will be understood that the above description of the present invention is susceptible to various modifications, changes and adaptations and the same are intended to be comprehended within the meaning and range of equivalents of the appended claims.

What is claimed is:

1. In a process for recovering metal values from waste containing $MFe_3(SO_4)_2(OH)_6$, where M is a monovalent ion, by leaching said waste with an acidic

TABLE 15

| Run No. | Cycle No. | Reactor Type | Extraction, % | | | | Filtrate Assay, g/l | | |
|---|---|---|---|---|---|---|---|---|---|
| | | | Zn | Ag | Pb | Pb-corr$^{(1)}$ | Zn | Ag | Pb |
| 12 | 1 | A | 37 | 76 | 86 | 86 | 7.0 | 0.071 | (15) |
| 12a | 2 | A | 31 | 76 | 80 | 87 | 11.6 | 0.135 | (26) |
| 12b | 3 | A | 35 | 75 | 76 | 84 | 18.9 | 0.191 | (36) |
| 12c$^{(2)}$ | 4 | B | 32 | 72 | 72 | 84 | (25.4) | (0.264) | (45) |
| 12d | 5 | B | 31 | 72 | 45 | 81 | (21.1) | (0.253) | (35) |

Values in parentheses are calculated.
$^{(1)}$Extractions calculated from rewashed residues. The Pb-corr (corrected) column presents the actual extraction achieved in the leach.
$^{(2)}$Filtrate was diluted to 67% strength prior to advancing to 12d leach. Dilution occurred when washing slurry from bomb reactor.

solution of metal chloride in a closed system, the improvement comprises leaching said waste with a solution comprising calcium chloride at a temperature above the atmospheric boiling point of the solution and under a pressure of at least the superatmospheric autogenous pressure which develops as the system is heated.

2. The process of claim 1 wherein said temperature is in excess of about 110° C.

3. The process of claim 1 wherein said solution has a pH of about 1.5 to about 3.5.

4. The process of claim 1 wherein said temperature is between about 120° C. and about 300° C.

5. The process of claim 1 wherein said calcium chloride concentration is between about 1.0 molar and the saturation point of the solution.

6. The process of claim 1 wherein said temperature is between about 150° C. and about 220° C.

7. The process of claim 1 wherein potassium is present at a concentration greater than about 0.5 grams per liter of said solution.

8. The process of claim 3 wherein said pH is maintained by adding a compound selected from the group consisting of calcium oxide, calcium hydroxide, calcium carbonate and mixtures thereof.

9. The process of claim 1 wherein chloride is provided by adding calcium chloride to said solution.

10. A process for recovering metal values from waste containing $MFe_3(SO_4)_2(OH)_6$ where M is a monovalent ion, wherein said process comprises contacting, in a closed system, said waste at a temperature of between about 120° C. and about 200° C. and a pressure of at least the superatmospheric autogenous pressure which develops as the system is heated with a solution containing between about 2.0 and about 4.0 molar calcium chloride wherein said solution has a pH of between about 1.5 and about 3.5 which is maintained by the addition of a calcium compound selected from the group consisting of calcium oxide, calcium hydroxide, calcium carbonate and mixtures thereof.

11. The process of claim 10 wherein said waste comprises ammonium jarosie formed by subjecting a material containing zinc ferrite to a leach said process consisting essentially of:
(a) mixing an aqueous slurry of said material with sulfuric acid and a source of ammonium ions to form a sulfuric acid leach mixture;
(b) heating said sulfuric acid leach mixture to form a solid containing ammonium jarosite and a liquid containing zinc sulfate; and
(c) conveying said solid into contact with said solution of calcium chloride.

12. The process of claim 10 wherein said leaching provides a liquid leachate and a solid residue and wherein said process further comprises:
(a) separating said liquid leachate from said solid residue wherein said solid residue comprises an iron oxide;
(b) contacting said liquid leachate with a reducing metal to reduce silver cations contained in said leachate to metallic silver and then recovering said metallic silver from the liquid phase;
(c) recovering zinc from the liquid phase of step (b) using a zinc recovery process to provide a liquid solution substantially free of zinc; and
(d) adjusting the pH of the liquid solution from step (c) to above about 9 by adding a basic material and then heating the solution to provide a vapor containing ammonia.

13. The process of claim 12 wherein said zinc is recovered in step (c) by a process comprising extracting said zinc by contacting the liquid phase containing said zinc with an extractant to remove said zinc from the liquid phase to a second phase.

14. The process of claim 12 wherein the basic material from step (d) is selected from the group consisting of calcium oxide, calcium hydroxide, calcium carbonate or mixtures thereof.

15. The process of claim 14 wherein said basic material consists essentially of calcium oxide.

16. The process of claim 12 wherein said reducing metal is selected from the group consisting of lead and zinc.

17. The process of claim 16 wherein said reducing metal is lead and wherein the process further comprises the steps (i) mixing the liquid phase remaining in step (b) after removing said metallic silver with a sulfide compound to precipitate the lead as lead sulfide, and (ii) removing substantially all of said lead sulfide from the solution and then conveying said substantially lead-free solution to the zinc recovery process.

18. The process of claim 16 wherein said reducing metal is lead and wherein the process further comprises the steps of:
(a) contacting the substantially zinc-free liquid phase from step (c) with sufficient calcium oxide, calcium hydroxide, calcium carbonate or mixtures thereof to provide a solution pH of between about 8 and about 9 to precipitate lead hydroxide;
(b) removing the precipitated lead hydroxide from the liquid phase;
(c) adding sufficient calcium oxide, calcium hydroxide, calcium carbonate or mixtures thereof to the liquid phase from step (ii) to increase the pH to above about 10; and
(d) increasing the temperature of the resulting solution to about the boiling point of said solution.

19. The process of claim 12 wherein said zinc is recovered by contacting said liquid phase from step (b) with calcium oxide, calcium hydroxide, calcium carbonate or mixtures thereof to precipitate said zinc as zinc hydroxide and separating said zinc hydroxide precipitate from the liquid phase.

20. A process for recovering metal values from waste containing $MFe_3(SO_4)_2(OH)_6$, where M is a monovalent ion, said process comprising:
(a) mixing an aqueous slurry containing a material comprising zinc ferrite, sulfuric acid and a source of ammonium ions to form a sulfuric acid leach mixture;
(b) heating said leach mixture to form a solid phase containing ammonium jarosite and a liquid phase containing zinc sulfate;
(c) separating said solid phase and said liquid phase;
(d) contacting said separated solid phase with a solution comprising between 1.0 and 5.0 molar calcium chloride in a closed system at a temperature between about 110° C. and about 300° C. and a pressure of at least the superatmospheric autogenous pressure which develops as the system is heated wherein said solution has a pH of between about 1.5 and about 3.5 to form a liquid leachate and a solid residue;
(e) separating said liquid leachate from said solid residue;
(f) contacting said liquid leachate with a reducing metal selected from the group consisting of lead and zinc to reduce silver cations contained in said leachate to metallic silver;

(g) separating said metallic silver from the liquid phase as a cement;

(h) recovering zinc contained in said liquid phase by contacting said liquid phase with an extractant which selectively removes said zinc from said liquid phase to a second phase;

(i) contacting the substantially zinc-free liquid phase from step (h) with sufficient calcium oxide, calcium hydroxide, calcium carbonate or mixtures thereof to provide a solution pH of between about 8 and 9 to precipitate lead hydroxide;

(j) removing the precipitated lead hydroxide from the liquid phase;

(k) adding sufficient calcium oxide, calcium hydroxide, calcium carbonate or mixtures thereof to the liquid phase from (j) to increase the pH to above about 10;

(l) increasing the temperature of the resulting solution to form a vapor containing ammonia and a liquid residue containing calcium chloride brine;

(m) condensing the vapor from step (l) to provide a solution containing ammonium hydroxide; and (n) recycling the liquid residue from step (l) to the calcium chloride leaching of step (d).

* * * * *

UNITED STATES PATENT AND TRADEMARK OFFICE
CERTIFICATE OF CORRECTION

PATENT NO. : 5,078,786
DATED : January 7, 1992
INVENTOR(S) : Peters et al.

It is certified that error appears in the above-identified patent and that said Letters Patent is hereby corrected as shown below:

Column 19, line 39, insert --200-- before "lb/ton"

Column 22, line 30, delete the second listed "45" and insert --46-- therefor

Column 27, line 41, delete "jarosie" and insert --jarosite-- therefor

Signed and Sealed this

Seventh Day of September, 1993

Attest:

BRUCE LEHMAN

Attesting Officer    Commissioner of Patents and Trademarks